US011451887B1

(12) United States Patent
Nicholson et al.

(10) Patent No.: US 11,451,887 B1
(45) Date of Patent: Sep. 20, 2022

(54) SYSTEMS, APPARATUS, AND METHODS FOR PROVIDING FILTERED SETS OF SENSOR DATA

(71) Applicant: Lenovo (Singapore) PTE. LTD., New Tech Park (SG)

(72) Inventors: John W. Nicholson, Cary, NC (US); Howard Locker, Cary, NC (US); Daryl C. Cromer, Raleigh, NC (US); Mengnan Wang, Chapel Hill, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/356,263

(22) Filed: Jun. 23, 2021

(51) Int. Cl.
*H04Q 9/02* (2006.01)

(52) U.S. Cl.
CPC ........... *H04Q 9/02* (2013.01); *H04Q 2209/20* (2013.01)

(58) Field of Classification Search
CPC .............................. H04Q 9/02; H04Q 2209/20
See application file for complete search history.

(56) References Cited

U.S. PATENT DOCUMENTS

| | | | |
|---|---|---|---|
| 5,832,411 A * | 11/1998 | Schatzmann | G01N 33/0075 702/30 |
| 9,619,623 B2 * | 4/2017 | Patel | G16H 40/63 |
| 9,997,039 B1 * | 6/2018 | Heaton | G08B 21/24 |
| 10,404,915 B1 * | 9/2019 | Chen | H04N 5/23264 |
| 10,410,750 B1 * | 9/2019 | McNair | G16H 50/20 |
| 10,420,486 B1 * | 9/2019 | McNair | A61B 5/1113 |
| 2010/0171636 A1 * | 7/2010 | Lee | G08C 23/04 340/12.22 |
| 2015/0381737 A1 * | 12/2015 | Quinn | H04L 67/12 709/217 |
| 2020/0336878 A1 * | 10/2020 | Chieh Tseng | H04W 52/0203 |
| 2021/0321942 A1 * | 10/2021 | Pushpala | A61B 5/28 |

* cited by examiner

*Primary Examiner* — Ojiako K Nwugo
(74) *Attorney, Agent, or Firm* — Kunzler Bean & Adamson

(57) ABSTRACT

Methods that can provide filtered sets of sensor data are provided. One method includes generating, by a processor from a set of raw data generated by a set of sensors, a set of sensor data for a user and filtering, by the processor, the received set of sensor data based on a permission of a plurality of permissions selected by the user prior to receipt of the set of raw sensor data from the set of sensors. The method further includes automatedly providing, by the processor, the filtered set of sensor data to a set of external entities. Systems and apparatus that can include, perform, and/or implement the methods are also provided.

20 Claims, 15 Drawing Sheets

SYSTEMS, APPARATUS, AND METHODS FOR PROVIDING FILTERED SETS OF SENSOR DATA

FIELD

The subject matter disclosed herein relates to computing networks, systems, and apparatus and, more particularly, relates to, systems, apparatus, and methods for providing filtered sets of sensor data.

BACKGROUND

The most common practice for collecting user information is to ask the user to fill out a form providing the desired user information. Since the user provides the user information, the user decides what user information to provide (e.g., name, address, phone number, email address, birthday, gender, etc.). Here, the user has clear knowledge and consent of the user information that is to be collected. Also, the user has the inherent option of providing false user information if the user desires such. This situation does not scale to the world(s) of artificial intelligence (AI) and/or computer vision (CV).

In the AI and/or CV world(s), systems and apparatus can gather biometric data without the user's knowledge and/or consent. For example, image processing in at least some computing systems and/or apparatus is/are capable of directly determining the user's age, gender, race, etc. Further, the same systems/apparatus can also determine and/or infer the user's name, address, phone number, email address, birthday, etc. using cloud computing techniques and information. In the future, systems and/or apparatus will be able to observe the user's health information (e.g., blood pressure, body temperature, heart rate, etc.) and determine the user's state of health based on the observed health information. All of this information and data could be collected and transmitted unfiltered to a third party without the user's knowledge and/or consent.

If consent does exist, such consent could often be buried in an End User License Agreement (EULA) that most users would never really read and/or understand. Thus, users of an AI service should be able to know and consent to what user information is being collected and utilized by an AI service.

BRIEF SUMMARY

Methods, systems, apparatus, and methods that can provide filtered sets of sensor data are provided. One method includes generating, by a processor from a set of raw sensor data generated by a set of sensors, a set of sensor data for a user and filtering, by the processor, the set of sensor data based on a permission of a plurality of permissions selected by the user prior to receipt of the set of raw sensor data from the set of sensors. The method further includes automatically providing, by the processor, the filtered set of sensor data to a set of external entities.

An apparatus includes a processor coupleable to a set of sensors configured to generate a set of raw sensor data and coupleable to a set of external entities and a memory coupled to the processor and configured to store code executable by the processor. The executable code causes the processor to generate, from the set of raw sensor data, a set of sensor data for a user, filter the set of sensor data based on a permission of a plurality of permissions selected by the user prior to receipt of the set of raw sensor data from the set of sensors, and automatedly provide the filtered set of sensor data to the set of external entities.

A computer program product comprising a computer-readable storage medium configured to store code executable by a processor is also provided. The executable code comprises code to perform generating, from a set of raw sensor data generated by a set of sensors, a set of sensor data for a user, filter the set of sensor data based on a permission of a plurality of permissions selected by the user prior to receipt of the set of raw sensor data from the set of sensors, and automatedly providing the filtered set of sensor data to the set of external entities.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1A:
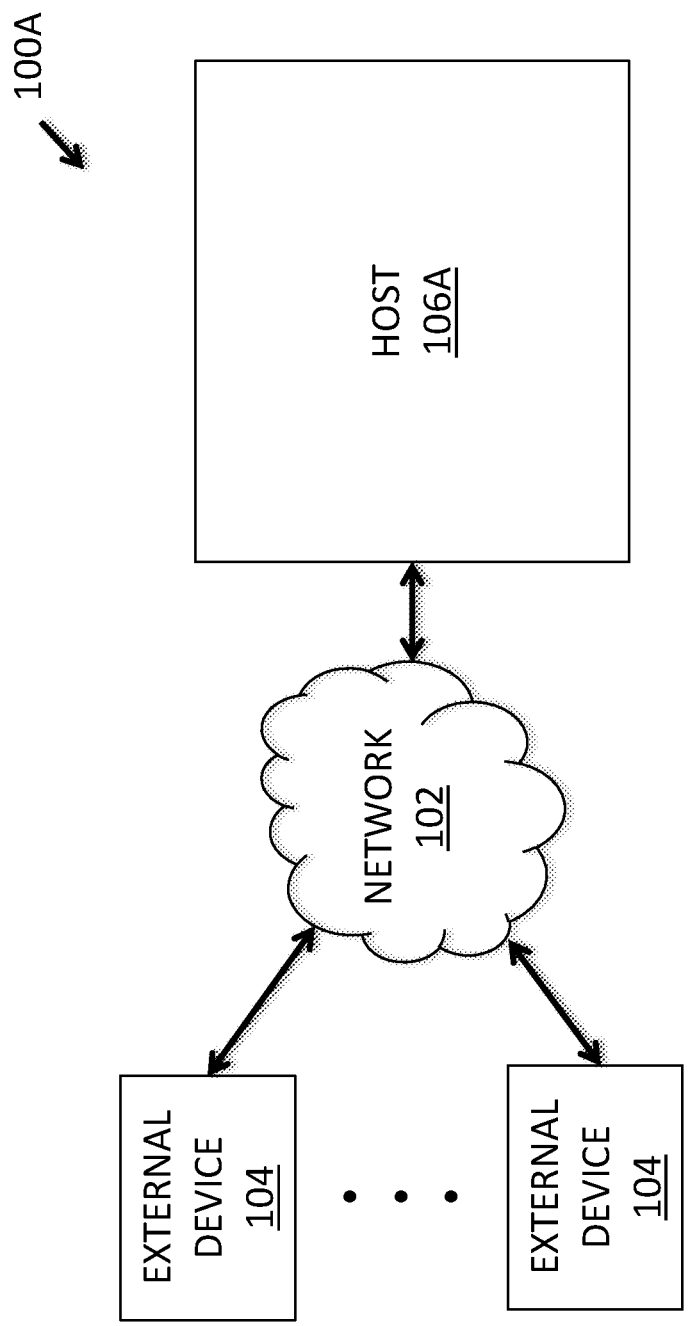
FIGS. 1A through 1D are block diagrams of various embodiments of a system or network for providing filtered sets of sensor data for a user.

Disclosed herein are various embodiments providing methods, systems, and computer program products that can provide filtered sets of sensor data for a user. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together and may include disparate instructions stored in different locations which, when joined logically together, include the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1A is a block diagram of one embodiment of a computing system 100A for providing filtered sets of sensor data. At least in the illustrated embodiment, the computing system 100A includes, among other components, a network 102 connecting a set of external devices 104 (also simply referred individually, in various groups, or collectively as external device(s) 104) and a host computing system and/or host computing device 106A (also simply referred to as host 106A).

The network 102 may include any suitable wired and/or wireless network 102 (e.g., public and/or private computer networks in any number and/or configuration (e.g., the Internet, an intranet, a cloud network, etc.)) that is known or developed in the future that enables the set of external devices 104 and the host 106A to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

An external device 104 may include any suitable computing device and/or computing system capable of accessing and/or sharing resources with the host 106A via the network 102. In various embodiments, one or more of the external devices 104 can provide a cloud-based service and/or a service that is external to the host 106A (e.g., an external service). An external device 104 can also include any suitable computing hardware and/or software (e.g., a thick client, a thin client, etc., or hybrid thereof) capable of accessing and/or sharing resources with the host 106A via the network 102.

Each external device 104, as part of its respective operation, relies on sending I/O requests to the host 106A to write data, read data, and/or modify data. Specifically, each external device 104 can transmit I/O requests to read, write, store, communicate, propagate, and/or transport instructions, data, computer programs, software, code, routines, etc., to the host 106 and may comprise at least a portion of a client-server model. In general, the host 106 can be accessed by the external device(s) 104 and/or communication with the host 106A can be initiated by the external device(s) 104 through a network socket (not shown) utilizing one or more inter-process networking techniques.

A host 106A (or host device 106A or host computing device 106A) may include any suitable computer hardware and/or software that can provide host operations. In various embodiments, a host computing device 106A can include one or more processors, computer-readable memory, and/or one or more interfaces, among other features and/or hardware. A host computing device 106A can further include any suitable software component or module, or computing device(s) that is/are capable of hosting and/or serving a software application or services, including distributed, enterprise, and/or cloud-based software applications, data, and services. For instance, a host computing device 106A can be configured to host, serve, or otherwise manage data sets, or applications interfacing, coordinating with, or dependent on or used by other services, including transportation service applications and software tools. In some instances, a host 106A can be implemented as some combination of devices that can comprise a common computing system and/or device, server, server pool, or cloud computing environment and share computing resources, including shared memory, processors, and interfaces.

At least in the illustrated embodiment, the host 106A is a stand-alone device. In other embodiments, the host 106A is not a stand-alone device. In various embodiments, the host 106A is configured to generate a set of sensor data for a user, filter the set of sensor data to generate a filtered set of sensor data, and transmit the filtered set of sensor data to one or more of the external devices 104. In certain embodiments, the host 106A is configured to automatedly generate a set of sensor data for a user, automatedly filter the set of sensor data to generate a filtered set of sensor data, and/or automatedly transmit the filtered set of sensor data to one or more of the external devices 104.

Figure 2A:
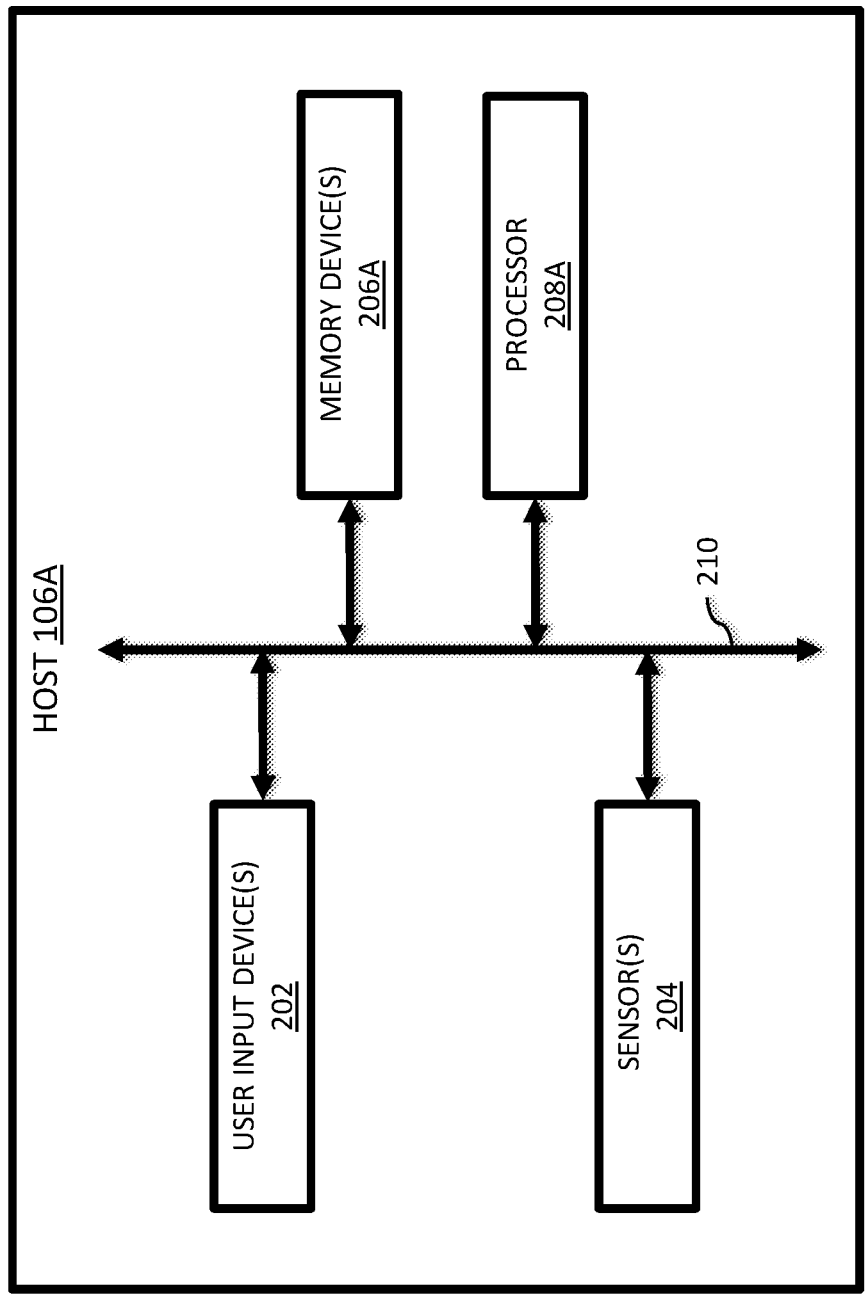
FIG. 2A is a block diagram of one embodiment of a host included in the system/network of FIG. 1A.

With reference to FIG. 2A, FIG. 2A is a block diagram of one embodiment of a host 106A. A host 106A may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). At least in the illustrated embodiment, the host 106A includes, among other components, a set of one or more user input devices 202, a set of one or more sensors 204 (or sensor device(s) 204), a set of one or more memory devices 206A, and a processor 208A coupled to and in communication with one another via a bus 210 (e.g., a wired and/or wireless bus).

A set of input devices 202 may include any suitable quantity of input devices 202. In some embodiments, the set of input devices 202 includes one (1) input device 202. In further embodiments, the set of input devices 202 includes two (2) or more input devices 202.

The set of input devices 202 may include any suitable input device(s) 202 that is/are known or developed in the future that can receive a set of inputs (e.g., one or more inputs) from a user. Example input devices 202 include, but are not limited to, a keyboard, a mouse, a touchscreen, a stylus, a trackball, a touchpad, a pointing stick, a knob, a remote, a paddle, a webcam, a microphone, an image scanner, a fingerprint scanner, a barcode reader, a digital pen, a camera, a joystick, etc., among other types of input devices that are possible and contemplated herein.

A set of sensors 204 may include any suitable quantity of sensors 204. In some embodiments, the set of sensors 204 includes one sensor 204. In further embodiments, the set of sensors 204 includes two or more sensors 204.

The set of sensors 204 may include any suitable sensor(s) 204 or sensor device(s) 204 that is/are known or developed in the future that can detect, sense, and/or measure energy as raw sensor data indicative of a set of biometric properties and/or conditions of a user. That is, the sensor(s) 204 can include any suitable device that can read and/or measure light, temperature, speed, and/or electrical capacity, etc. as raw sensor data, among other types of physical inputs that can be utilized as raw sensor data to indicate and/or represent a set of biometric properties, states, and/or conditions of a user that are possible and contemplated herein. Example sensors 204 include, but are not limited to, an image sensor (e.g., a camera, a video recorder, a webcam, a thermal imager, a facial recognition device, a CMOS image sensor, an X-ray scanner, a magnetic resonance imaging (Mill) scanner, etc.), a temperature sensor (e.g., a thermometer etc.), a fingerprint reader, an eye scanner, a microphone, an ultrasound sensor, etc., among other types of sensor devices and/or biometric sensors that are possible and contemplated herein.

In some embodiments, each sensor 204 is configured to generate a raw sensor signal including a set of raw sensor data (or simply raw sensor data) indicating and/or representing a physical input corresponding to its particular type of sensor 204. In various embodiments, the raw sensor signal(s) including the raw sensor data are generated by the sensor(s) 204 in real-time as the sensor(s) 204 is/are detecting, sensing, and/or measuring the physical input(s) indicative of the set of biometric properties and/or conditions of the user. In additional embodiments, each sensor 204 is configured to transmit the generated raw sensor signal(s) including the raw sensor data to a set of one or more memory devices (e.g., memory device(s) 206A and memory device(s) 206B) and/or a processor (e.g., processor 208A and processor 208B), as discussed elsewhere herein.

A set of memory devices 206A may include any suitable quantity of memory devices 206A. In some embodiments, the set of memory devices 20206A includes one memory device 206A. In further embodiments, the set of memory devices 206A includes two or more memory devices 206A.

Each memory device 206A may include any suitable type of device and/or system that is known or developed in the future that can store computer-useable data. In various embodiments, a memory device 206A may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A memory device 206A, in some embodiments, includes volatile computer storage media. For example, a memory device 206A may include random access memory (RAM), including dynamic RAM (DRAM), synchronous dynamic RAM (SDRAM), and/or static RAM (SRAM). In other embodiments, a memory device 206A includes non-volatile computer storage media. For example, a memory device 206A may include a hard disk drive, a flash memory, and/or any other suitable non-volatile computer storage device that is known or developed in the future. In various embodiments, a memory device 206A includes both volatile and non-volatile computer storage media. In additional embodiments, a memory device 206A also stores program code and/or related data, such as an operating system (OS) and/or other controller algorithms operating on a host computing device 106.

Figure 3A:
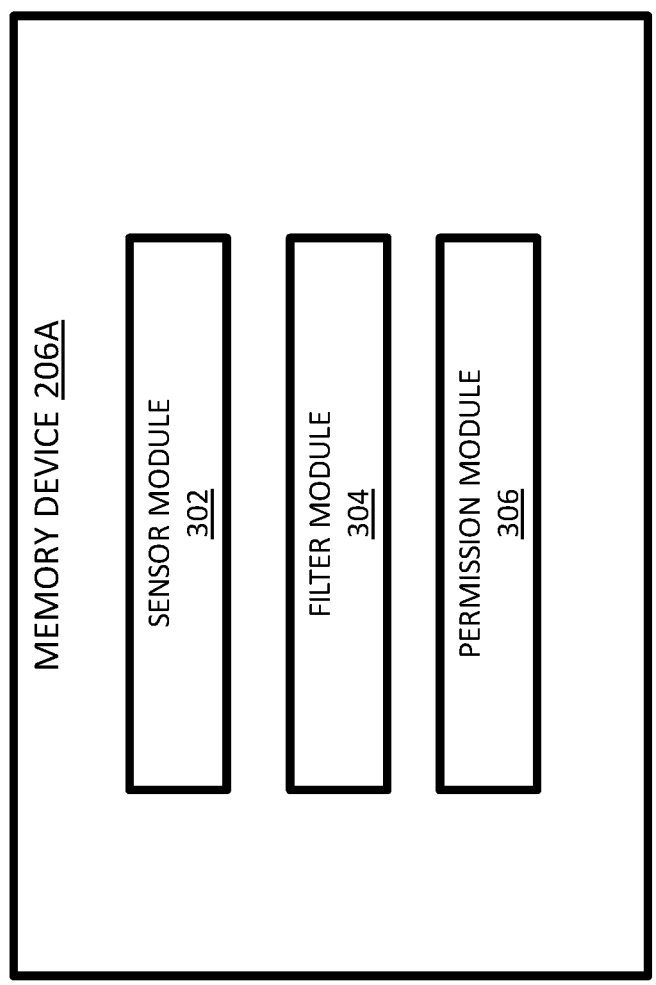
FIG. 3A is a block diagram of one embodiment of a memory device included in the host of FIG. 2A or 2C.

Referring to FIG. 3A, FIG. 3A is a block diagram of one embodiment of a memory device 206A. At least in the illustrated embodiment, the memory device 206A includes, among other components, a sensor module 302, a filter module 304, and a permission module 306.

In at least some embodiments, the sensor module 302, the filter 304, and/or the permission module 306 include computer-executable code and/or computer-useable code. In certain embodiments, the computer-executable code and/or computer-useable code including the sensor module 302, the filter 304, and/or the permission module 306 is/are stored on one or more computing devices/systems, one or more computer hardware devices/systems, one or more non-transitory computer-readable storage devices, and/or one or more non-transitory computer-readable storage mediums. In some embodiments, the computer-executable code and/or computer-useable code including the sensor module 302, the filter 304, and/or the permission module 306 is/are embedded on the one or more computing devices/systems, the one or more computer hardware devices/systems, the one or more non-transitory computer-readable storage devices, and/or the one or more non-transitory computer-readable storage mediums.

A sensor module 302 may include any suitable hardware and/or software that can receive one or more raw sensor signals from the sensor(s) 204 and convert the raw sensor signal(s) to one or more corresponding sensor signals. The raw sensor signal(s) may include any suitable raw sensor signal that is known or developed in the future and/or the sensor signal(s) may include any suitable sensor signal that is known or developed in the future.

In various embodiments, the sensor module 302 is configured to convert the physical input(s) in the received raw sensor signal(s) detected by the corresponding sensor device 204 to one or more sensor signals including a set of sensor data (or simply sensor data) that indicate(s) and/or represent(s) one or more biometric properties and/or conditions of a user. In various embodiments, the biometric properties/conditions in the sensor data can include, but are not limited to, one or more personal traits (e.g., gender, age, race, nationality, age-decade, eye color, hair color, skin color, voice, height, handicap(s), fingerprint, iris, retina, etc.), one or more biometric traits (e.g., body temperature, blood pressure, heartrate, hydration level, blood oxygen level, glucose level, muscle use, overall health, etc.) and/or contextual traits (e.g., mood, stress level, focus, attention, etc.), among other user physical properties/conditions that are capable of being detected by a sensor device 204 that are possible and contemplated herein.

In various embodiments, the sensor module 302 is configured to generate the set of sensor data in real-time. That is, the sensor module 302 is configured to generate the set of sensor data as the sensor module 302 receives the set of raw sensor data from the sensor device(s) 204. In additional or alternative embodiments, the set of sensor data is generated by the sensor module 302 not in real-time (e.g., at a time subsequent to the sensor module 302 receiving the raw sensor data from the sensor device(s) 204).

In certain embodiments, the generated sensor data is stored in a library, which may or may not be a dedicated library (e.g., in memory device(s) 206), for future use and/or current use. In additional or alternative embodiments, the raw sensor data is stored in a library (e.g., in memory device(s) 206) for future use and/or current use, which can be the same library or a different library than the library storing the sensor data, which further may or may not be a dedicated library (e.g., in memory device(s) 206).

The sensor data generated by the sensor module 302 can be utilized to gain insight (e.g., state of health, etc.) about the user and/or verify the identity of the user, among other uses that are possible and contemplated herein. As such, in various embodiments, the set of sensor data can be transmitted (e.g., via a set of one or more sensor signals) to one or more external devices 104 (e.g., one or more cloud-based services and/or one or more external services) for use by one or more third parties (e.g., one or more medical professionals/entities, one or more financial professionals/entities, one or more computer professionals/entities, one or more law enforcement professionals/agencies, one or more employers, one or more government professionals/agencies, and/or one or more retail professional/entities, among other types of third parties that are possible and contemplated herein) associated with, controlling, and/or managing the external device(s) 104.

Though useful in gaining insight and/or verifying the identity of a user, for certain situations and/or transactions it may not be necessary to transmit all of the generated sensor data to the one or more third parties or to a particular third party and/or the user may not want/desire that all of the generated sensor data be transmitted to the third party/parties or to a particular third party. As such, various embodiments of the host 106A can provide a filtered set of sensor data (e.g., a subset of the sensor data and/or a limited version of the sensor data corresponding to the collected raw sensor data) to the external device(s) 104. To filter the set of sensor data generated by the sensor module 302, the sensor module 302 is configured to transmit the generated set of sensor data to the filter module 304.

A filter module 304 may include any suitable hardware and/or software that can receive a set of sensor data from a sensor module 302 and filter (or limit) the received set of sensor data to generate one or more filtered sets of sensor data. The filter module 304 can filter/limit the set of sensor data utilizing any data filtering/limiting algorithm and/or technique that is known or developed in the future capable of generating the filtered set(s) of sensor data.

In various embodiments, the filter module 304 is configured to receive a set of sensor data from a sensor module 302 and, in response there to, filter (or limit) the received set of sensor data to generate one or more filtered sets of sensor data (and/or generate one or more subsets of the sensor data) in accordance with and/or consistent with a set of permissions (e.g., one or more permissions) implemented via and/or implemented by a permission module 306, as discussed elsewhere herein with respect to various embodiments of a permission module 306. Further, the filter module 304 and/or the host 106A can provide the filtered set(s) of sensor data to one or more external devices 104 (and/or one or more third parties associated with and/or corresponding to the external device(s) 104). In additional or alternative embodiments, the filter module 304 and/or the host 106A can provide the filtered set(s) of sensor data to the external device(s) 104 in accordance with and/or consistent with a set of permissions implemented by a permission module 306, which can be the same set of permissions utilized to generate the filtered set(s) of sensor data and/or a different set of permissions than the set of permissions utilized to generate the filtered set(s) of sensor data, as further discussed elsewhere herein with respect to the various embodiments of a permission module 306.

In some embodiments, the filter module 304 is computationally located between the sensing device(s) 204 and one or more of the external devices 104 (e.g., at least one external device 104 and/or all of the external devices 104). In other embodiments, the filter module 304 is computationally located between the sensor module 302 and one or more of the external devices 104. In still other embodiments, the filter module 304 is computationally located between one or more of the external devices 104 and both the sensing device(s) 204 and the sensor module 302.

Being located computationally between the sensing device(s) 204 and/or the sensor module 302 and the external device(s) 104, in some embodiments, allows/enables the filter module 304 to filter/limit the set of sensor data (e.g., generate the filtered set(s) of sensor data and/or subset(s) of sensor data) in a manner that is transparent to the one or more external devices 104 (e.g., at least one external device 104 and/or all of the external devices 104) coupled/coupleable to the host 106A and/or to the one or more third parties associated with, corresponding to, and/or managing each respective external device 104 of the set of one or more external devices 104. That is, various embodiments of the filter module 304 can be configured to generate the filtered set(s) of sensor data and/or transmit the filtered set(s) of sensor data to the external device(s) 104 without the external device(s) 104 (and/or each third party associated with, corresponding to, and/or managing each respective external device 104) knowing that a set of sensor data (and/or raw sensor data) has been filtered/limited (e.g., is a filtered set of sensor data (and/or is, in effect, a filtered set of raw sensor data and/or a subset of raw sensor data)) and/or without the external device(s) 104 knowing that any sensor data received from the filter module 304 and/or the host 106A is a filtered set of sensor data (and/or is a subset of the sensor data (and/or is, in effect, a filtered set of raw sensor data and/or a subset of raw sensor data)).

In additional or alternative embodiments, being located computationally between the sensing device(s) 204 and/or the sensor module 302 and the external device(s) 104, in some embodiments, allows/enables the filter module 304 to filter/limit the set of sensor data (e.g., generate the filtered set(s) of sensor data) in a manner that is transparent to the sensor device(s) 204 and/or the sensor module 302. That is, various embodiments of the filter module 304 can be configured to generate the filtered set(s) of sensor data and/or transmit the filtered set(s) of sensor data to the external device(s) 104 without the sensing device(s) 204 and/or the sensor module 302 knowing that a set of sensor data (and/or raw sensor data) is going to be filtered/limited, has been filtered/limited (e.g., is a filtered set of sensor data (and/or is, in effect, a filtered set of raw sensor data and/or a subset of raw sensor data)), and/or without the external device(s) 104 knowing that a filtered set of sensor data (and/or a subset of the sensor data (and/or, in effect, a filtered set of raw sensor data and/or a subset of raw sensor data)) is going to be transmitted/provided to one or more external device(s) 104 and/or to one or more third parties.

The filter module 304, in various embodiments, is configured to filter the set of sensor data (e.g., filter the content of the sensor data, limit the sensor data, and/or limit the content of the sensor data) to generate a filtered set of sensor data (or simply filtered sensor data) and/or a subset of the sensor data, as discussed elsewhere herein. In certain embodiments, the filter module 304 is configured to filter the set of sensor data to generate filtered sensor data and/or a subset of the sensor data based on one or more permissions of a plurality of permissions. That is, in at least some embodiments the set of sensor data generated by the sensor module 302 is filtered by the filter module 304 in accordance with and/or consistent with a permission implemented by a permission module (see, e.g., permission module 306), as discussed elsewhere herein.

In various embodiments, the filter module 304 is configured to generate the filtered set of sensor data in real-time. That is, the filter module 304 is configured to filter/limit the set of sensor data received from the sensor module 302 to generate the filtered set of sensor data (or subset of the sensor data) as the filter module 304 receives the sensor data from the sensor module 302. In additional or alternative embodiments, the filtered sensor data (or subset of the sensor data) is generated by the filter module 304 not in real-time (e.g., at a time subsequent to the filter module 304 receiving the sensor data included in the sensor signal(s) from the sensor module 302), but prior to transmission to the external device(s) 104.

In further embodiments, the filtered set of sensor data may be stored in a library (e.g., in memory device(s) 206) for future use and/or current use. The library storing the filtered sensor data can be the same library that stores the raw sensor data and/or sensor data for the user and/or in a different library (e.g., in memory device(s) 206) that may or may not be dedicated for storing the filtered set of sensor data.

The filter module 304, in various embodiments, in configured to transmit the filtered set of sensor data for the user to one or more of the external devices 104. In some embodiments, each external device 104 receives the same filtered set of sensor data. In other embodiments, at least two (2) external devices 104 receive different filtered sets of sensor data.

In some embodiments, the different filtered sets of sensor data transmitted to different external devices 104 may be based on and/or generated from the same set of sensor data for the user (and the same set of raw sensor data for the user and/or one or more of the same sensor devices 204). Here, the different filtered sets of sensor data may be generated based on one or more permissions and/or based on various permissions implemented on the host 106A (e.g., via a permission module 306). That is, the implemented permission(s) may result in multiple different filtered sets of sensor data being generated from the same set of sensor data for the user and the host 106A and/or the filter module 304 transmitting each of the different filtered sets of sensor data to at least two different external devices 104 (and/or to at least two different third parties).

For example, the host 106A can transmit a first filtered set of sensor data to a first external device and transmit a second filtered set of sensor data to a second external device 104 that is different from the first filtered set of sensor data transmitted to first external device. Here, while the first filtered set of sensor data and the second filtered set of sensor data are different filtered sets of sensor data, the first and second different filtered sets of sensor data can be based on and/or generated from the same set of sensor data generated by the sensor module 302 (which can be further based on the same set of raw sensor data and/or sensor device(s) 204). Further, the first filtered set of sensor data and the second filtered set of sensor data may be generated by the filter module 304 in response to one or more permissions implemented on the host 106A (e.g., via a permission module 306) providing that such different sets of sensor data be generated in general and/or in specific terms, that such different sets of sensor data be transmitted to different external devices 104 in general and/or in specific terms, and/or that such different sets of sensor data be transmitted to different third parties in general and/or in specific terms.

In addition to or in the alternative, the first filtered set of sensor data and the second filtered set of sensor data (e.g., different sets of filtered sensor data) may be transmitted to the different external devices 104 (e.g., the first and second external devices 104) in response to one or more permissions implemented on the host 106A (e.g., via a permission module 306) providing that such different sets of sensor data be transmitted to different external devices 104 in general and/or in specific terms, different types of external devices 104 in general and/or in specific terms, different third parties in general and/or in specific terms, different types of third parties in general and/or in specific terms, different third parties associated with and/or corresponding to the different external devices 104 in general and/or in specific terms, different types of third parties associated with and/or corresponding to the different external devices 104 in general and/or in specific terms, different third parties associated with and/or corresponding to the different types of external devices 104 in general and/or in specific terms, and/or different types of third parties associated with and/or corresponding to the different types of external devices 104 in general and/or in specific terms, among other combinations, factor(s), criteria/criterion, and/or terms that are possible and contemplated herein.

In some embodiments, the first filtered set of sensor data and the second filtered set of sensor data (e.g., different sets of filtered sensor data) may each be respective particular and/or specific filtered sets of sensor data that are generated by the filter module 304 from the same set of sensor data in response to one or more permissions implemented on the host 106A (e.g., via a permission module 306) providing that such particular/specific different sets of sensor data be generated in general and/or in specific terms. Here, each respective particular and/or specific different set of filtered sensor data may be generated from the same set of sensor data in response to one or more permissions implemented on the host 106A (e.g., via a permission module 306) providing that each respective particular/specific different set of sensor data being transmitted to different external devices 104 in general and/or in specific terms, different types of external devices 104 in general and/or in specific terms, different third parties in general and/or in specific terms, different types of third parties in general and/or in specific terms, different third parties associated with and/or corresponding to the different external devices 104 in general and/or in specific terms, different types of third parties associated with and/or corresponding to the different external devices 104 in general and/or in specific terms, different third parties associated with and/or corresponding to the different types of external devices 104 in general and/or in specific terms, and/or different types of third parties associated with and/or corresponding to the different types of external devices 104 in general and/or in specific terms, among other combinations, factor(s), criteria/criterion, and/or terms that are possible and contemplated herein.

In some additional or alternative embodiments, the first filtered set of sensor data and the second filtered set of sensor data (e.g., different sets of filtered sensor data) may each be respective particular and/or specific types of filtered sets of sensor data that are generated by the filter module 304 from the same set of sensor data in response to one or more permissions implemented on the host 106A (e.g., via a permission module 306) providing that such particular/specific different types of sets of sensor data be generated in general and/or in specific terms. Here, each respective particular and/or specific different type of set of filtered sensor data may be generated from the same set of sensor data in response to one or more permissions implemented on the host 106A (e.g., via a permission module 306) providing that each respective particular/specific different set of sensor data being transmitted to different external devices 104 in general and/or in specific terms, different types of external devices 104 in general and/or in specific terms, different third parties in general and/or in specific terms, different types of third parties in general and/or in specific terms, different third parties associated with and/or corresponding to the different external devices 104 in general and/or in specific terms, different types of third parties associated with and/or corresponding to the different external devices 104 in general and/or in specific terms, different third parties associated with and/or corresponding to the different types of external devices 104 in general and/or in specific terms, and/or different types of third parties associated with and/or corresponding to the different types of external devices 104 in general and/or in specific terms, among other combinations, factor(s), criteria/criterion, and/or terms that are possible and contemplated herein.

In certain embodiments, the different filtered sets of sensor data transmitted to different external devices 104 may be based on and/or generated from different sets of sensor data for the user (and different sets of raw sensor data for the user and/or one or more different sensor devices 204). Here, the different filtered sets of sensor data may be generated based on one or more permissions and/or based on various permissions implemented on the host 106A (e.g., via a permission module 306) in general and/or in specific terms. That is, the implemented permission(s) may result in multiple different filtered sets of sensor data being generated from different sets of sensor data for the user in general and/or in specific terms.

In some embodiments, the filter module 304 and/or the host 106A is/are configured to transmit the different filtered sets of sensor data generated from the different sets of sensor data for the same user to the same external device 104 (and/or to the same third party/parties associated with the same external device 104). In certain embodiments, the different filtered sets of sensor data may be transmitted in response to one or more permissions implemented on the host 106A (e.g., via a permission module 306) providing that such different filtered sets of sensor data generated from the different sets of sensor data be transmitted to the same external device 104 (and/or to the same third party/parties associated with the same external device 104) in general and/or in specific terms.

In other embodiments, the filter module 304 and/or the host 106A is/are configured to transmit the different filtered sets of sensor data generated from the different sets of sensor data for the same user to at least two different external devices 104 (and/or to at least two different third parties). In certain embodiments, the filter module 304 and/or the host 106A is/are configured to transmit the different filtered sets of sensor data generated from the different sets of sensor data for the same user to at least two different external devices 104 (and/or to at least two different third parties) in response to one or more permissions implemented on the host 106A (e.g., via a permission module 306) providing that the different sets of sensor data be transmitted to at least two different external devices 104 (and/or to at least two different third parties) in general and/or in specific terms. In some embodiments, the one or more permissions implemented on the host 106A (e.g., via a permission module 306) providing that the different sets of sensor data generated from the different sets of sensor data be transmitted to the two or more different external devices 104 (and/or to at least two different third parties) can be based on the different external device(s) 104 in general and/or specific terms, the type(s) of external devices for one or more of the different external devices 104 in general and/or in specific terms, the third party/parties associated with one or more of the different external device(s) 104 in general and/or in specific terms, and/or the type(s) of third party/parties associated with one or more of the different external devices 104 in general and/or in specific terms, among other combinations, factor(s), criteria/criterion, and/or terms that are possible and contemplated herein.

In certain embodiments, the filter module 304 and/or the host 106A is/are configured to transmit two or more of the different filtered sets of sensor data generated from the different sets of sensor data for the same user to at least a first external device 104 and further transmit at least one, two or more, or all of the different filtered sets of sensor data generated from the different sets of sensor data for the same to at least a second external device 104 (and/or to at least one different third party) that is different from the first external device 104. In certain embodiments, the filter module 304 and/or the host 106A is/are configured to transmit the two or more different filtered sets of sensor data generated from the same set of sensor data for the same user to the first external device(s) 104 and further transmit the one, two or more, or all of the different filtered sets of sensor data generated from the different sets of sensor data for the same user to the second external device(s) 104 in response to one or more permissions implemented on the host 106A (e.g., via a permission module 306) providing that the two or more different filtered sets of sensor data generated from the same set of sensor data for the same user be provided to the first external device(s) 104 and further providing that one, two or more, or all of the different filtered sets of sensor data generated from the different sets of sensor data for the same user be transmitted to the second external device(s) 104 in general and/or in specific terms. In some embodiments, the one or more permissions implemented on the host 106A (e.g., via a permission module 306) providing that the two or more different filtered sets of sensor data generated from the same set of sensor data for the same user be provided to the first external device(s) 104 and further providing that one, two or more, or all of the different filtered sets of sensor data generated from the different sets of sensor data for the same user be transmitted to the second external device(s) 104 can be based on the different external device(s) 104 in general and/or specific terms, the type(s) of the different external device(s) 104 in general and/or in specific terms, the third party/parties associated with the different external device(s) 104 in general and/or in specific terms, and/or the type(s) of third party/parties associated with the different external device(s) 104 in general and/or in specific terms, among other combinations, factor(s), criteria/criterion, and/or terms that are possible and contemplated herein.

A permission module 306 may include any suitable hardware and/or software that can implement a permission (or permission level) for filtering the sensor data of a user of a host computing device 106A. In some embodiments, the user can implement or set the permission. In additional or alternative embodiments, a system administrator can implement or set the permission.

In various embodiments, the implemented permission is one of a plurality of permissions, which can be based on the external device 104, type of external device 104, entity/entities associated with the external device(s) 104, and/or type of entity/entities associated with the external device(s) 104, as discussed above with reference to the filter module 304. In additional or alternative embodiments, the implemented permission can include, among other permissions, a location-based permission, a prompted permission, an application-specific permission, a service-specific permission, a quantity-based permission, a time-based permission, and combinations thereof, among other permissions that are possible and contemplated herein. In some embodiments, the implemented permission(s) includes(s) a nexus between two or more permissions.

A location-based permission, in some embodiments, can allow and/or enable the filter module 304 to filter the set of sensor data in accordance with instructions, conditions, and/or limits set by a user or an administrator. For example, a location-based permission may include instructions, conditions, and/or limits indicating that the filter module 304 is to completely filter the set of sensor data (e.g., not provide a filtered set of sensor data to the external device(s) 104) when the user (as detected by the host 106A) is located at the user's home, is within a predetermined distance of the user's home or other geographic location, is outside a predetermined distance of the user's home or other geographic location, and/or is not located at a particular geographic location (e.g., the office of a medical professional, the office of a financial professional, etc.), among other instructions, conditions, and/or limits for filtering a set of biometric based on a geographic location that are possible and contemplated herein.

Other non-limiting examples of a location-based permission may include instructions, conditions, and/or limits indicating that the filter module 304 is to filter the set of sensor data so that the filtered set of sensor data includes sensor data corresponding to the geographic location. A specific non-limiting example may include filtering the sensor data so that the filtered set of sensor data includes the user's fingerprint and providing the filtered set of sensor data including the user's fingerprint to an external device 104 (e.g., a device of a financial institution) while the host 106A is located at an office of the financial institution (e.g., a geographic location). Another specific non-limiting example may include filtering the sensor data so that the filtered set of sensor data includes the user's heartrate, blood pressure, weight, and/or temperature, etc. and providing the filtered set of sensor data including the user's heartrate, blood pressure, weight, and/or temperature, etc. to an external device 104 (e.g., a device of a medical professional) while the host 106A is located at the office of the medical professional (e.g., a geographic location).

A prompted permission, in some embodiments, can instruct the filter module 304 to filter the set of sensor data to include a subset of the sensor data in response to prompting the user for permission for each request from an external device 104 to receive sensor data and receiving such permission for each respective request from the user. In additional or alternative embodiments, the user's permission provided in response to each request can allow and/or enable the user to set the type and/or amount of sensor data that the filter module 304 includes in the filtered set of sensor data that is provided to the requesting external device 104.

An application-specific permission, in some embodiments, can instruct the filter module 304 to filter the set of sensor data so that the filtered set of sensor data includes sensor data corresponding to a particular application and/or type of application. For example, an application-specific permission may filter the set of sensor data to include the user's facial features for an application and/or type of application that desires to verify the identity of the user (e.g., a social media account, an email account, a financial account, a school account, an employment account, etc.), among other biometrics and/or applications that are possible and contemplated herein.

A service-specific permission, in some embodiments, can instruct the filter module 304 to filter the set of sensor data so that the filtered set of sensor data includes sensor data corresponding to a particular service and/or type of service. For example, a service-specific permission may filter the set of sensor data to include the user's overall health for a service and/or type of service that desires to verify the health of the user (e.g., a high adventure service, a ride at an amusement park, a travel service, a sporting activity/event, etc.), among other biometrics and/or services that are possible and contemplated herein.

A quantity-based permission, in some embodiments, can instruct the filter module 304 to automatedly and/or automatically provide the filtered set of sensor data to one or more external devices 104 a predetermined quantity of times. The quantity-based permission can further include instructions that cause the filter module 304 to prompt user for additional confirmation (permission) prior to providing the filtered set of sensor data to an external device 104 after the predetermined quantity has been reached.

A time-based permission, in some embodiments, can instruct the filter module 304 to provide a filtered set of sensor data at a specific time, within a predetermined window/period of time, and/or within a specific amount of time. In some embodiments, the specific time, predetermined window/period of time, and/or specified amount of time can be based on any suitable criteria or criterion (e.g., a particular external device 104, a type of external device 104, a type of user, a type of sensor data, one or more types of third party associated with an external device 104, one or more particular third parties associated with an external device 104, etc., among other criteria/criterion that is/are possible and contemplated herein).

While the above embodiments and/or examples of various permissions have been provided with reference to particular embodiments and/or examples, such embodiments and/or are examples are provided in an effort to understand the principles and/or scope of the various embodiments/examples and are not intended to limit the spirit and/or scope of the various embodiments and/or examples in any manner. That is, various other embodiments and/or examples are possible and each/all of such other possible embodiments/examples that are consistent with the principles and/or scope of the various permissions discussed above are contemplated herein.

With reference again to FIG. 1A, a processor 208A may include any suitable non-volatile/persistent hardware and/or software configured to perform and/or facilitate performing functions and/or operations for providing filtered sets of sensor data. In various embodiments, the processor 208A includes hardware and/or software for executing instructions in one or more modules and/or applications that can perform and/or facilitate performing functions and/or operations for facilitating providing filtered sets of sensor data.

Figure 4A:
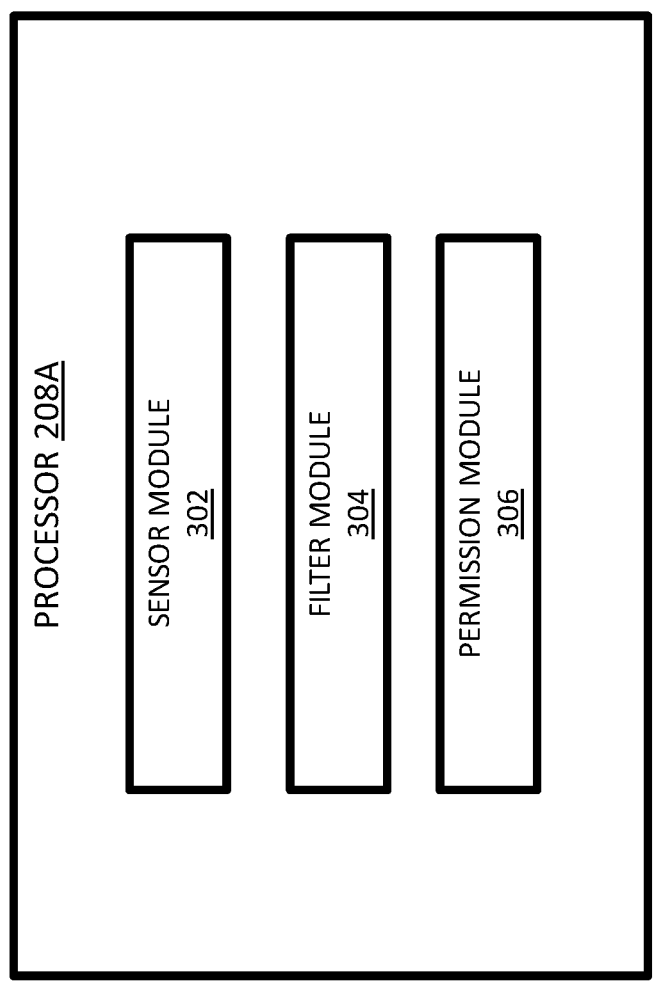
FIG. 4A is a block diagram of one embodiment of a processor included in the host of FIG. 2A or 2C.

The modules and/or applications executed by the processor 208A for facilitating providing filtered sets of sensor data on a host 106A, in various embodiments, can be stored on and executed from a memory device 206A and/or can be stored on and executed from the processor 208A (see, FIG. 4A). That is, in some embodiments (see, e.g., FIG. 4A), the processor 208A can store and execute a sensor module 302, a filter module 304, and/or a permission module 306 in lieu of or in addition to the sensor module 302, the filter module 304, and/or the permission module 306 stored on the memory device(s) 206A.

Figure 1B:
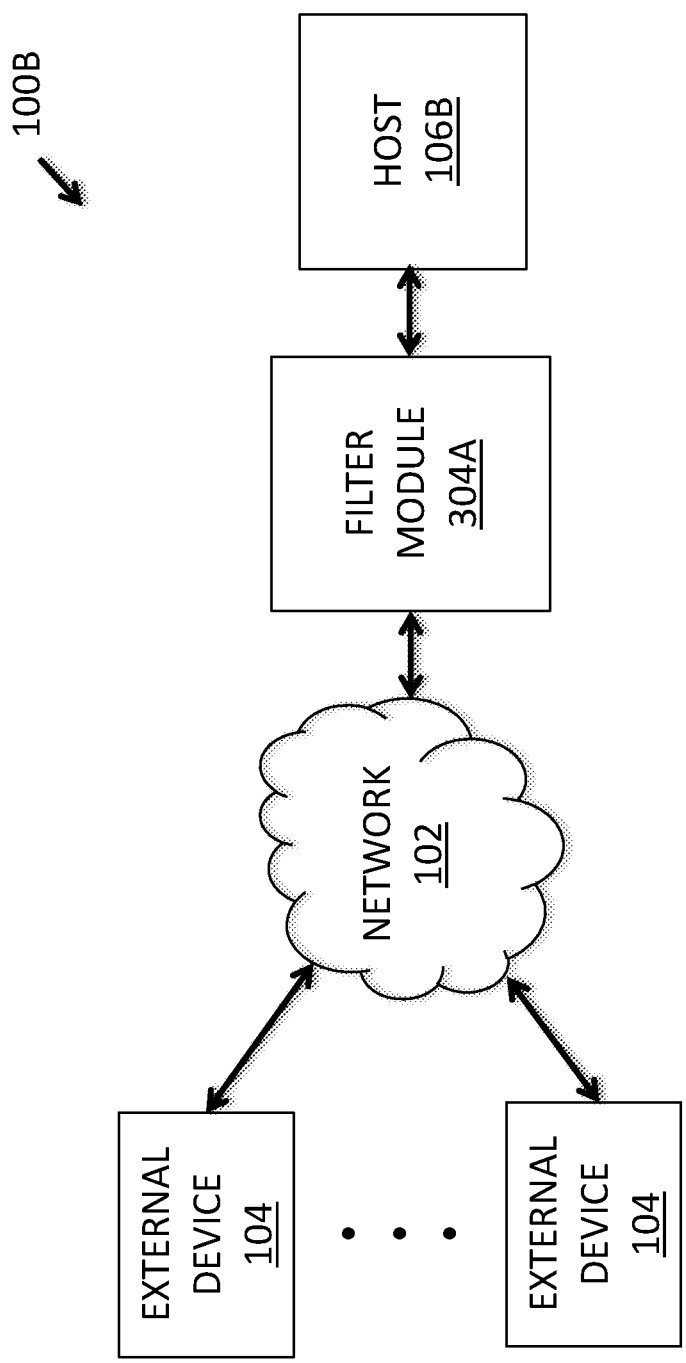

Referring to FIG. 1B, FIG. 1B is a block diagram of another embodiment of a computing system 100B for providing filtered sets of sensor data. The computing system 100B includes a network 102 connected to a set of external devices 104 similar to the network 102 and the set of external devices 104 included in the computing system 100A discussed elsewhere herein. At least in the illustrated embodiment, the computing system 100B further includes, among other components, a filter module 304A coupled to a host computing system and/or host computing device 106B (also simply referred to as host 106B) and further coupled/coupleable to the network 102.

A host 106B may include any suitable computer hardware and/or software that can provide host operations. In various embodiments, a host computing device 106B can include one or more processors, computer-readable memory, and/or one or more interfaces, among other features and/or hardware. A host computing device 106B can further include any suitable software component or module, or computing device(s) that is/are capable of hosting and/or serving a software application or services, including distributed, enterprise, and/or cloud-based software applications, data, and services. For instance, a host computing device 106B can be configured to host, serve, or otherwise manage data sets, or applications interfacing, coordinating with, or dependent on or used by other services, including transportation service applications and software tools. In some instances, a host 106B can be implemented as some combination of devices that can comprise a common computing system and/or device, server, server pool, or cloud computing environment and share computing resources, including shared memory, processors, and interfaces.

At least in the illustrated embodiment, the host 106B is a stand-alone device. In other embodiments, the host 106B is not a stand-alone device. In various embodiments, the host 106B is configured to facilitate generating a set of sensor data for a user, facilitate filtering the set of sensor data to generate a filtered set of sensor data, and facilitate transmitting the filtered set of sensor data to one or more of the external devices 104. In certain embodiments, the host 106B is configured to automatically generate a set of sensor data for a user based on a set of raw sensor data and/or automatedly transmit the generated set of sensor data the filter module 304. The host 106A, in various embodiments, is configured to transmit the filtered set(s) of sensor data to the external device(s) 104 in accordance with the implemented permission(s).

Figure 2B:
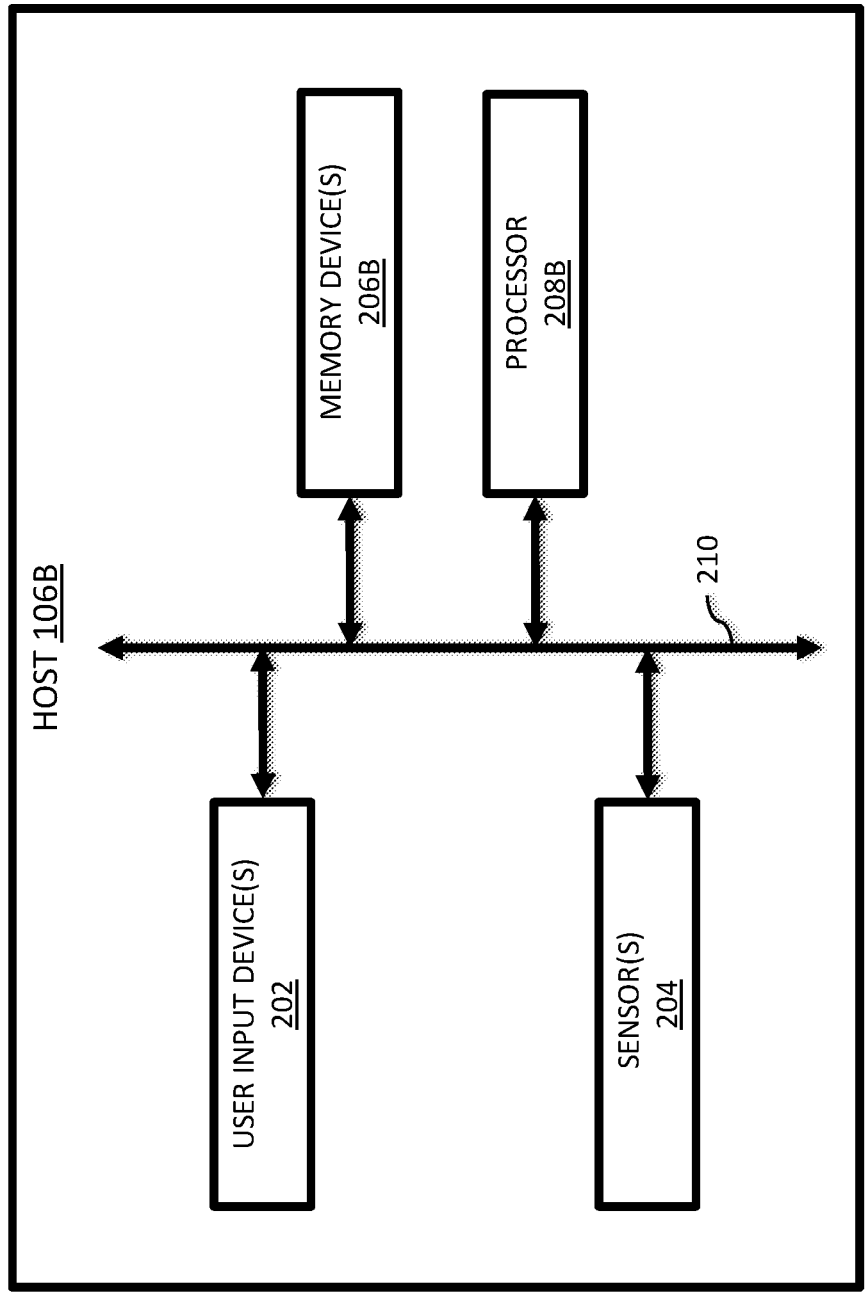
FIG. 2B is a block diagram of another embodiment of a host included in the system/network of FIG. 1B.

Referring to FIG. 2B, FIG. 2B is a schematic block diagram of another embodiment of a host computing device 106B. A host computing device 106B may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). The host computing device 106B includes a set of one or more user input devices 202 and a set of one or more sensor devices 204 similar to the host computing device 106A discussed with reference to FIG. 2A. At least in the embodiment illustrated in FIG. 2B, the host computing device 106B further includes, among other components, a set of memory devices 206B and a processor 208B coupled to and in communication with one another and the set of one or more user input devices 202 and the set of one or more sensor devices 204 via a bus 210 (e.g., a wired and/or wireless bus).

Figure 3B:
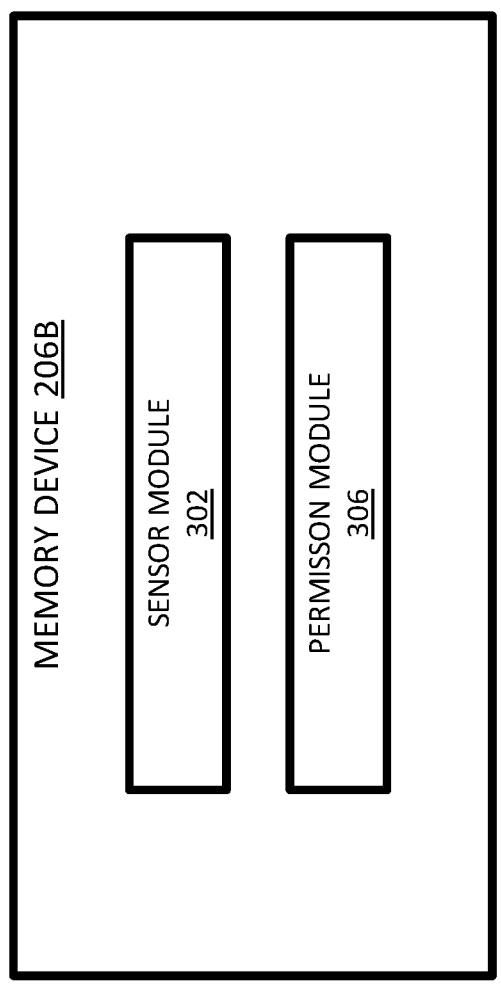
FIG. 3B is a block diagram of another embodiment of a memory device included in the host of FIG. 2B or 2D.

With reference to FIG. 3B, FIG. 3B is a schematic block diagram of another embodiment of a memory device 206B. The memory device(s) 206B can each include a device and/or system similar to the memory device(s) 206A discussed elsewhere herein. At least in the illustrated embodiment, the memory device 206B includes, among other components, a sensor module 302 and a permission module 306 similar to the sensor module 302 and the permission module 306 discussed elsewhere herein with reference to the memory device(s) 206A (see, FIG. 3A) and the processor 208A (see, FIG. 4A).

The memory device(s) 206B can each include a device and/or system similar to the memory device(s) 206A discussed elsewhere herein. Further, the processor 208B can include a device and/or system similar to the processor 208A discussed elsewhere herein.

With reference to FIG. 3B, FIG. 3B is a schematic block diagram of another embodiment of a memory device 206B. At least in the illustrated embodiment, the memory device 206B includes, among other components, a sensor module 302 and a permission module 306 similar to the sensor module 302 and the permission module 306 discussed elsewhere herein with reference to the memory device(s) 206A (see, FIG. 3A) and the processor 208A (see, FIG. 4A).

Figure 4B:
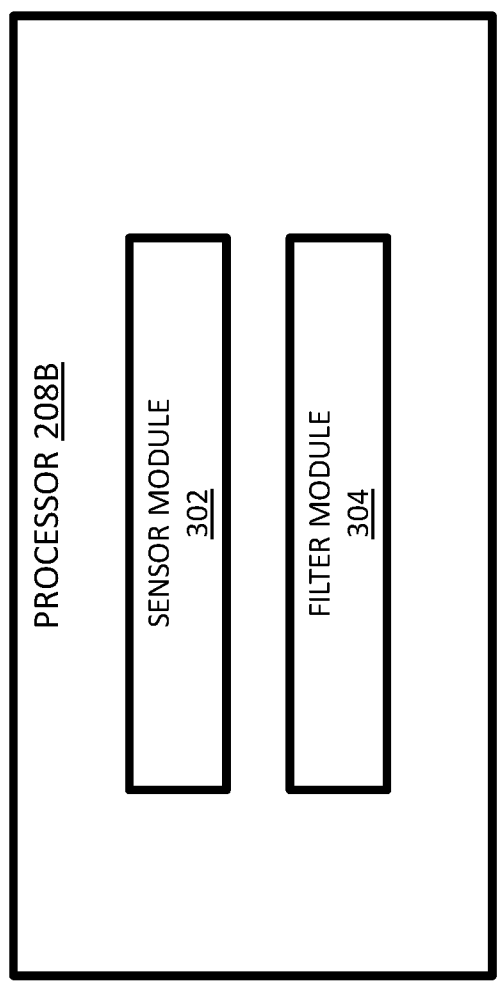
FIG. 4B is a block diagram of another embodiment of a processor included in the host of FIG. 2B or 2D.

Referring to FIG. 4B, FIG. 4B is a schematic block diagram of another embodiment of a processor 208B. At least in the illustrated embodiment, the processor 208B includes, among other components, a sensor module 302 and a permission module 306 similar to the sensor module 302 and the permission module 306 discussed elsewhere herein with reference to the memory device(s) 206A (see, FIG. 3A), the processor 208A (see, FIG. 4A), and the memory device(s) 206B (see, FIG. 3B).

The modules and/or applications executed by the processor 208B for facilitating providing filtered sets of sensor data on a host 106B, in various embodiments, can be stored on and executed from a memory device 206B and/or can be stored on and executed from the processor 208B (see, FIG. 4B). That is, in some embodiments (see, e.g., FIG. 4B), the processor 208B can store and execute a sensor module 302 and/or a permission module 306 in lieu of or in addition to the sensor module 302 and/or the permission module 306 stored on the memory device(s) 206B.

With reference again to FIG. 1B, a filter module 304A may include any suitable hardware and/or software similar to the various embodiments of the filter module 304 discussed elsewhere herein. That is, the filter module 304A is configured to receive a set of sensor data from a sensor module 302 and filter (or limit) the received set of sensor data to generate one or more filtered sets of sensor data in accordance with a set of permissions implemented by a permission module 306.

At least in the illustrated embodiment, the filter module 304A is a stand-alone application, device, and/or system. In other embodiments, the filter module 304A can be include as part of a device and/or system that can also include the sensor module 302 and/or permission module 306. Further, FIG. 1B shows that at least the filter module 304A is computationally located between one or more of the external device(s) 104 and the sensor(s) 204 and/or the sensor module 302.

The filter module 304A, in various embodiments, is configured to transmit the filtered set(s) of sensor data to the external device(s) 104 in accordance with the implemented permission(s). In some embodiments, the filter module 304A is configured to automatedly transmit the filtered set(s) of sensor data to the external device(s) 104.

Figure 1C:
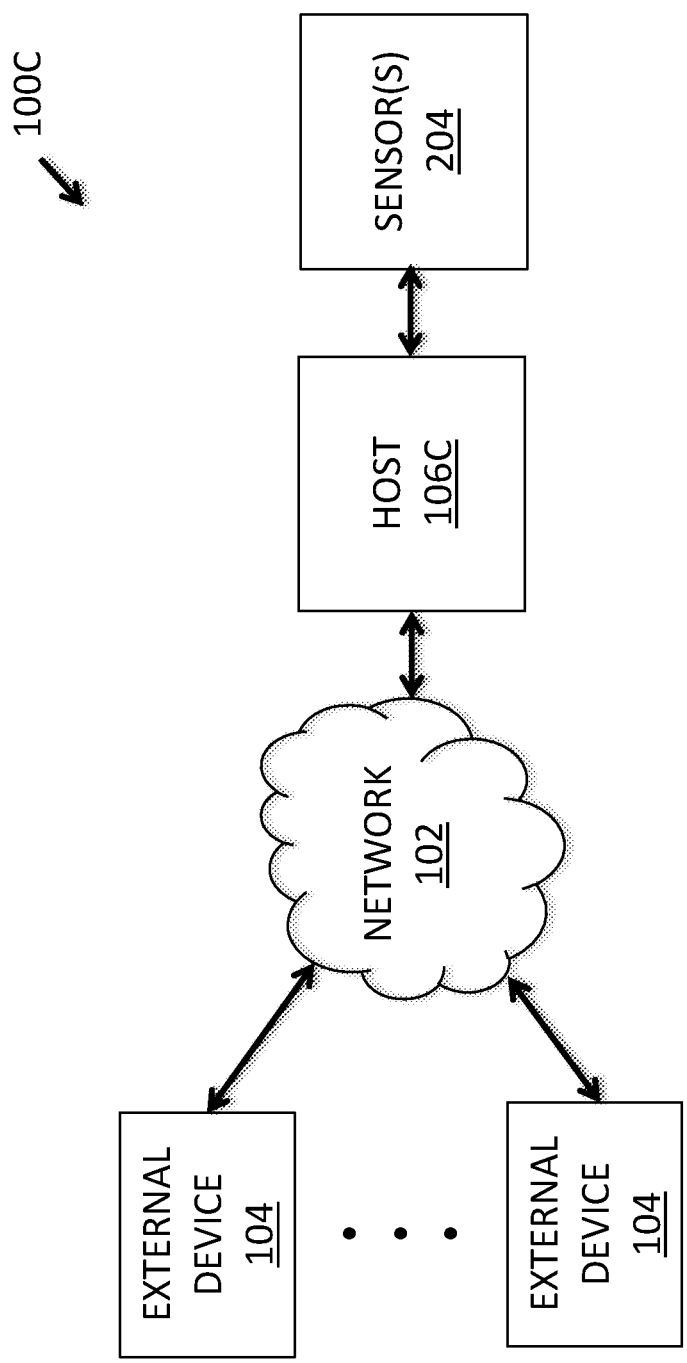

Referring to FIG. 1C, FIG. 1C is a block diagram of still another embodiment of a computing system 100C for providing filtered sets of sensor data. The computing system 100C includes a network 102 connected to a set of external devices 104 similar to the various networks 102 and external device(s) 104 discussed elsewhere herein. At least in the illustrated embodiment, the computing system 100C further includes, among other components, a set of sensors 204 coupleable/coupled to a host computing system and/or host computing device 106C (also simply referred to as host 106C) in which the host 106C is further coupleable/coupled to the network 102.

The set of sensors 204 may include any suitable quantity of sensors 204 that can detect one or more biometric properties/states of a user, as discussed elsewhere herein. Further, the sensor(s) 204 may include any suitable type(s) of sensor(s) 204 that can detect one or more biometric properties/states of a user, as discussed elsewhere herein. In various embodiments, the sensor(s) 204 are configured to transmit a set of raw sensor signals including raw sensor data to the host 106C.

A host 106C may include any suitable computer hardware and/or software that can provide host operations. In various embodiments, a host computing device 106C can include one or more processors, computer-readable memory, and/or one or more interfaces, among other features and/or hardware. A host computing device 106C can further include any suitable software component or module, or computing device(s) that is/are capable of hosting and/or serving a software application or services, including distributed, enterprise, and/or cloud-based software applications, data, and services. For instance, a host computing device 106C can be configured to host, serve, or otherwise manage data sets, or applications interfacing, coordinating with, or dependent on or used by other services, including transportation service applications and software tools. In some instances, a host 106C can be implemented as some combination of devices that can comprise a common computing system and/or device, server, server pool, or cloud computing environment and share computing resources, including shared memory, processors, and interfaces.

At least in the illustrated embodiment, the host 106C is a stand-alone device. In other embodiments, the host 106C is not a stand-alone device. In various embodiments, the host 106C is configured to facilitate generating a set of sensor data for a user, facilitate filtering the set of sensor data to generate a filtered set of sensor data, and facilitate transmitting the filtered set of sensor data to one or more of the external devices 104. In certain embodiments, the host 106C is configured to automatedly generate a set of sensor data for a user, automatedly filter the set of sensor data to generate a filtered set of sensor data, and/or automatedly transmit the filtered set of sensor data to one or more of the external devices 104. The host 106C, in various embodiments, is configured to transmit the filtered set(s) of sensor data to the external device(s) 104 in accordance with the implemented permission(s).

Figure 2C:
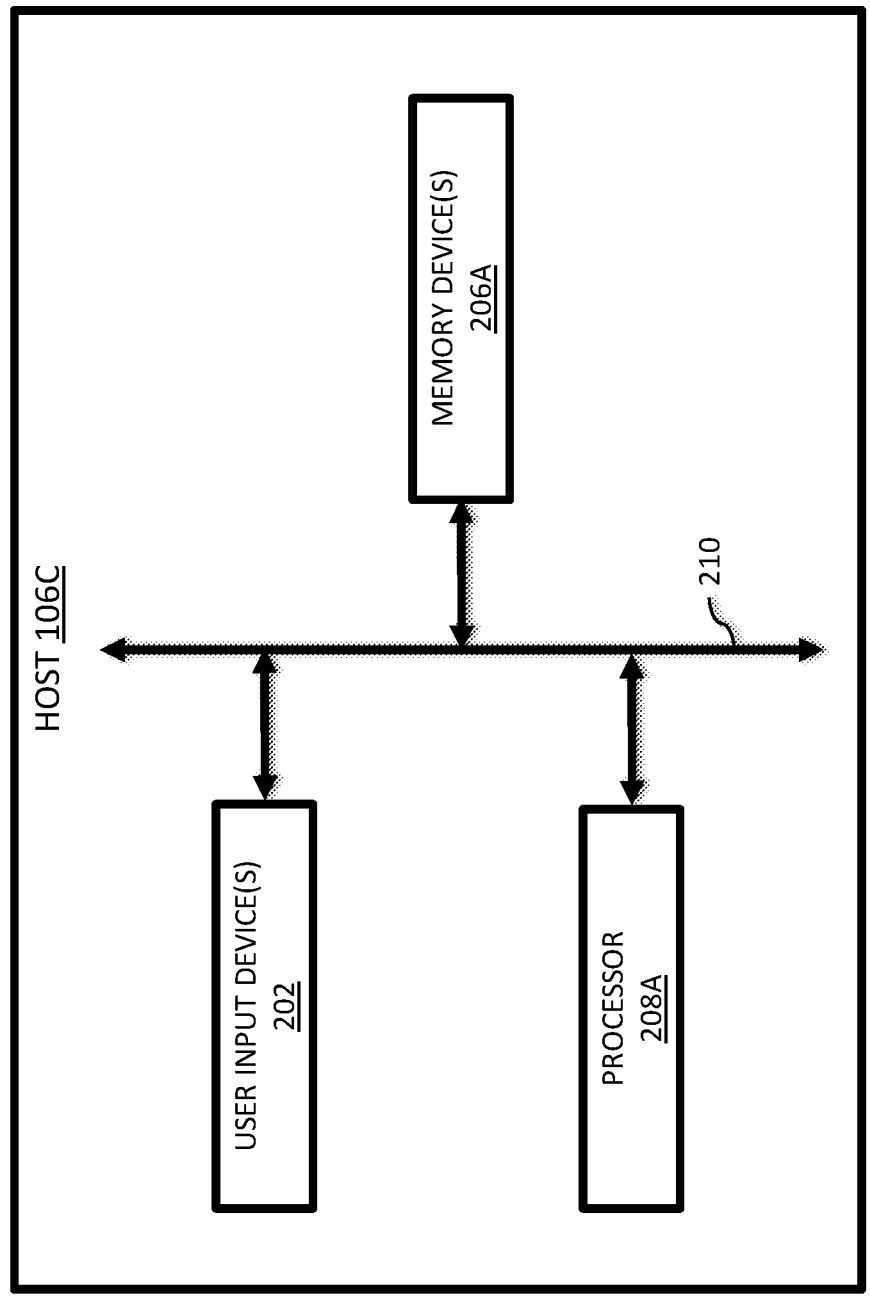
FIG. 2C is a block diagram of still another embodiment of a host included in the system/network of FIG. 1C.

Referring to FIG. 2C, FIG. 2C is a schematic block diagram of yet another embodiment of a host computing device 106C. A host computing device 106C may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). At least in the embodiment illustrated in FIG. 2C, the host computing device 106C includes, among other components, a set of one or more user input devices 202, a set of memory devices 206A (see, FIG. 3A), and a processor 208A (see, FIG. 4A) coupled to and in communication with one another via a bus 210 (e.g., a wired and/or wireless bus) similar to the host computing device 106A discussed with reference to FIG. 2A.

Here, the host 106C is configured to receive the raw sensor signal(s) including the user raw sensor data from the sensor(s) 204 that are external to the host 106C. In some embodiments, the host 106C may include one or more sensors 204 similar to the host 106A. Further, the host 106C is configured to transmit filtered sets of sensor data for a user to one or more of the external devices 104 similar to various other embodiments, as discussed elsewhere herein.

Figure 1D:
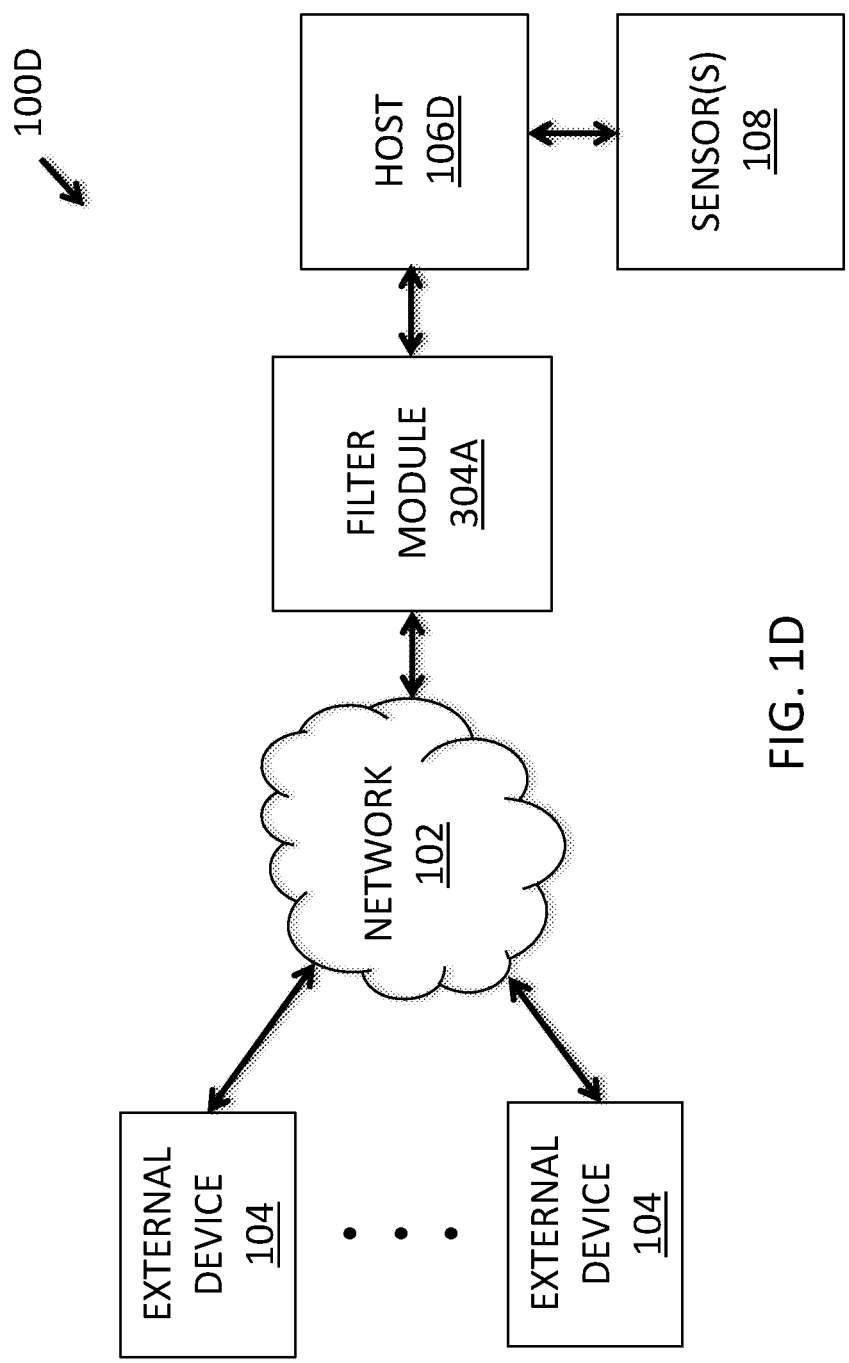

With reference to FIG. 1D, FIG. 1D is a block diagram of yet another embodiment of a computing system 100D for providing filtered sets of sensor data. The computing system 100D includes a network 102 connected to a set of external devices 104 similar to the various networks 102 and external device(s) 104 discussed elsewhere herein. At least in the illustrated embodiment, the computing system 100D further includes, among other components, a set of sensors 204 coupleable/coupled to a host computing system and/or host computing device 106D (also simply referred to as host 106D) in which the host 106C is further coupled to a filter module 304 that is further coupleable/coupled to the network 102.

The set of sensors 204 may include any suitable quantity of sensors 204 that can detect one or more biometric properties/states of a user, as discussed elsewhere herein. Further, the sensor(s) 204 may include any suitable type(s) of sensor(s) 204 that can detect one or more biometric properties/states of a user, as discussed elsewhere herein. In various embodiments, the sensor(s) 204 are configured to transmit a set of raw sensor signals including raw sensor data to the host 106D.

A host 106D may include any suitable computer hardware and/or software that can provide host operations. In various embodiments, a host computing device 106D can include one or more processors, computer-readable memory, and/or one or more interfaces, among other features and/or hardware. A host computing device 106D can further include any suitable software component or module, or computing device(s) that is/are capable of hosting and/or serving a software application or services, including distributed, enterprise, and/or cloud-based software applications, data, and services. For instance, a host computing device 106C can be configured to host, serve, or otherwise manage data sets, or applications interfacing, coordinating with, or dependent on or used by other services, including transportation service applications and software tools. In some instances, a host 106D can be implemented as some combination of devices that can comprise a common computing system and/or device, server, server pool, or cloud computing environment and share computing resources, including shared memory, processors, and interfaces.

At least in the illustrated embodiment, the host 106D is a stand-alone device. In other embodiments, the host 106D is not a stand-alone device. In various embodiments, the host 106D is configured to facilitate generating a set of sensor data for a user, facilitate filtering the set of sensor data to generate a filtered set of sensor data, and facilitate transmitting the filtered set of sensor data to one or more of the external devices 104. In certain embodiments, the host 106D is configured to automatedly generate a set of sensor data for a user based on a set of raw sensor data and/or automatedly transmit the generated set of sensor data to the filter module 304.

Figure 2D:
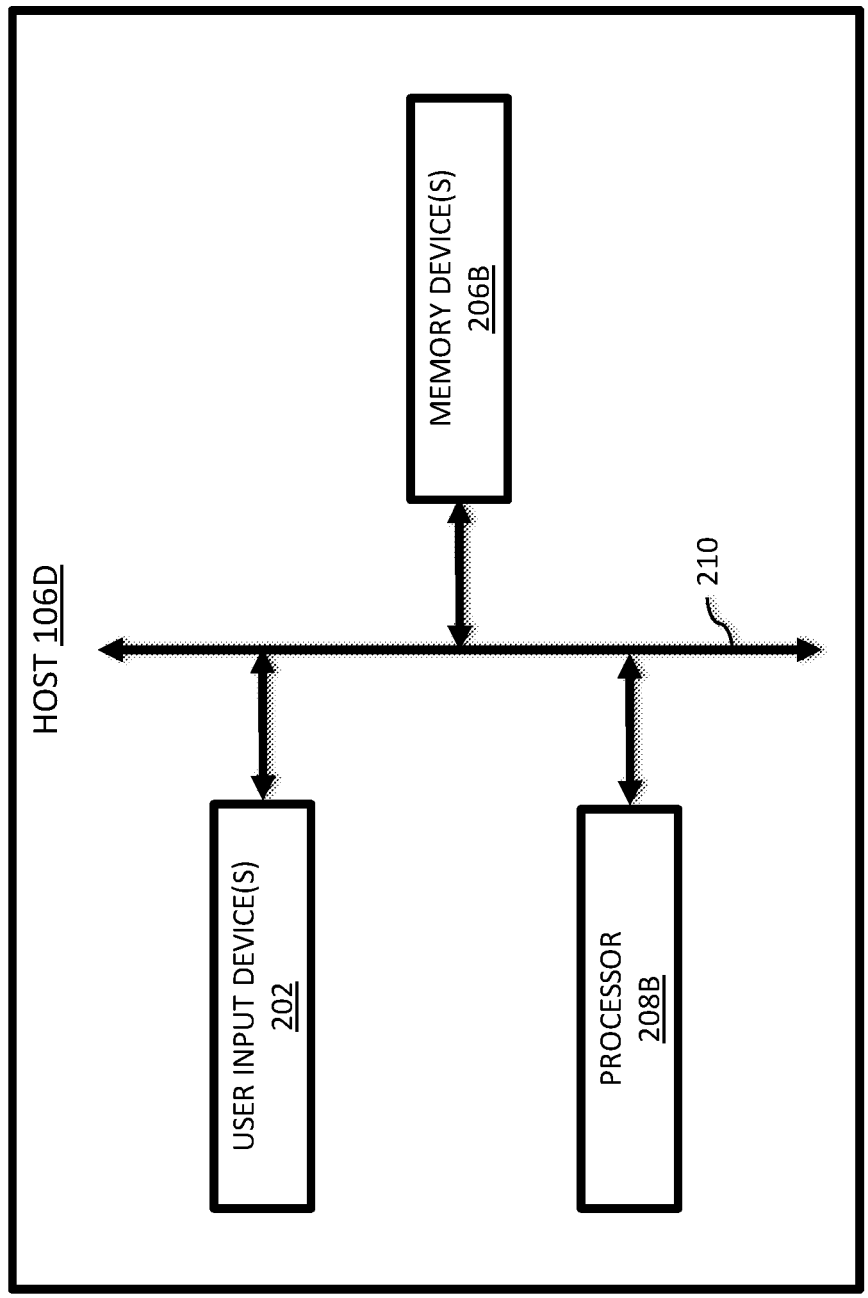
FIG. 2D is a block diagram of yet another embodiment of a host included in the system/network of FIG. 1D.

Referring to FIG. 2D, FIG. 2D is a schematic block diagram of yet another embodiment of a host computing device 106D. A host computing device 106D may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). At least in the embodiment illustrated in FIG. 2D, the host computing device 106D includes, among other components, a set of one or more user input devices 202, a set of memory devices 206B (see, FIG. 3B), and a processor 208B (see, FIG. 4B) coupled to and in communication with one another via a bus 210 (e.g., a wired and/or wireless bus) similar to the host computing device 106B discussed with reference to FIG. 2B.

Here, the host 106D is configured to receive the raw sensor signal(s) including the user raw sensor data from the sensor(s) 204 that are external to the host 106D. In some embodiments, the host 106D may include one or more sensors 204 similar to the host 106B. Further, the host 106D is configured to transmit generated sets of sensor data for a user to the filter module 304.

As discussed above, a filter module 304A may include any suitable hardware and/or software similar to the various embodiments of the filter module 304 discussed elsewhere herein. That is, the filter module 304A is configured to receive a set of sensor data from a sensor module 302 and filter (or limit) the received set of sensor data to generate one or more filtered sets of sensor data in accordance with a set of permissions implemented by a permission module 306.

At least in the illustrated embodiment, the filter module 304A is a stand-alone application, device, and/or system. In other embodiments, the filter module 304A can be include as part of a device and/or system that can also include the sensor module 302 and/or permission module 306. Further, FIG. 1B shows that at least the filter module 304A is computationally located between one or more of the external device(s) 104 and the sensor(s) 204 and/or the sensor module 302.

The filter module 304A, in various embodiments, is configured to transmit the filtered set(s) of sensor data to the external device(s) 104 in accordance with the implemented permission(s). In some embodiments, the filter module 304A is configured to automatedly transmit the filtered set(s) of sensor data to the external device(s) 104.

In operation, a user (and/or system administrator) of a host computing device 106A, 106B, 106C, and 106D (also referred to individually or collectively as, host(s) 106) can select, set, and/or implement one of a plurality of permissions for providing filtered sets of sensor data generated from sets of corresponding sets of sensor data. The permission can be selected, set, and/or implemented by the user and/or system administrator in a permission module 306 based on any suitable criteria or criterion, as discussed elsewhere herein.

The implemented permission is applied to a filter module 304 on the host 106. The implemented permission can also be applied to a filter module 304A that is separate from and/or external to the host 106, which may also be a stand-alone application, device, and/or system.

After the permission is selected, implemented, and/or set, the sensor device(s) 204 can detect/sense one or more biometric properties/states of a user and generate a set of raw sensor data. The sensor device(s) 204 transmit (in real-time or not in real-time via raw sensor signal(s)) the set of raw sensor data to a sensor module 302, which can optionally be stored in memory (e.g., one or more memory device(s) 206).

The sensor module 302 receives the set of raw sensor data and, in response thereto, generates a set of sensor data corresponding to the set of raw sensor data for the user, which can optionally be stored in memory (e.g., one or more memory device(s) 206). The sensor module 302 transmits (in real-time or not in real-time via sensor signal(s)) the set of sensor data to the filter module 304 or 304A.

The filter module 304 or 304A receives the set of sensor data for the user and filters (in real-time or not in real-time) the set of sensor data to generate a filtered set of sensor data, which can optionally be stored in memory (e.g., one or more memory device(s) 206). The set of sensor data for the user is filtered by the filter module 304 or 304A in accordance with and/or consistent with the permission(s) implemented by the permission module 306. Also, the set of raw sensor data can be indirectly filtered, filtered in essence by, or in effect filtered by the implemented permission as it is applied to the set of sensor data.

The host, filter module 304, and/or filter module 304A can transmit (in real-time or not in real-time) the filtered set of sensor data to one or more of the external device(s) 104. The filtered set of sensor data also can be selectively transmitted to the external device(s) 104 via the implemented set of permissions.

In addition, because the filter module 304 or 304A is/are computationally located between the external device(s) 104 and the sensor(s) 204 and/or the sensor module 302, the set of sensor data can be filtered and/or the filtered set of sensor data for the user can be generated without one or more of the external devices 104 knowing that the sensor data and/or raw sensor data has been filtered and/or the received sensor data for the user is a filtered set of sensor data. Similarly, because the filter module 304 or 304A is/are computationally located between the external device(s) 104 and the sensor(s) 204 and/or the sensor module 302, the set of sensor data can be filtered and/or the filtered set of sensor data for the user can be generated without one or more sensor(s) 204 and/or the sensor module 302 knowing that the sensor data and/or raw sensor data will be filtered before being transmitted to the external device(s) 104.

Figure 5:
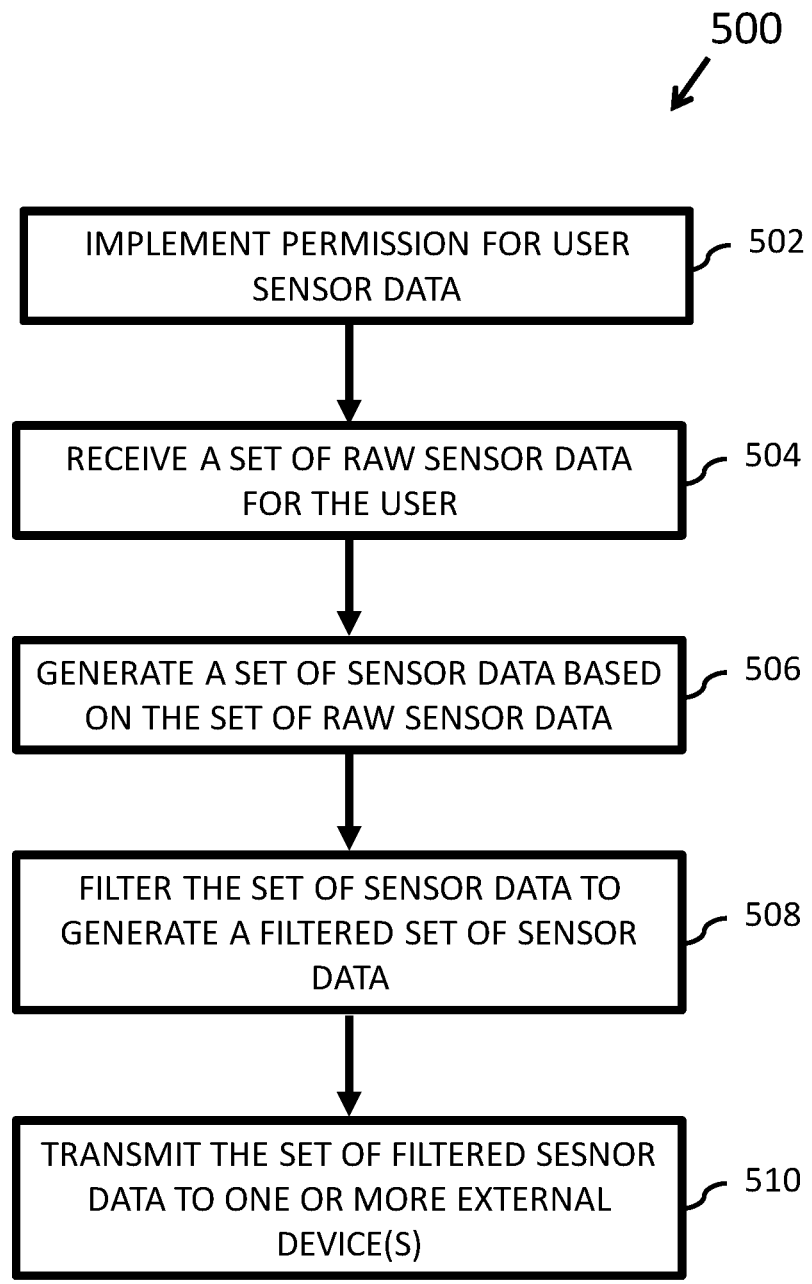
FIGS. 5 through 7 are schematic flow chart diagrams illustrating various embodiments of a method for providing filtered sets of sensor data for a user.

With reference to FIG. 5, FIG. 5 is a schematic flow chart diagram illustrating one embodiment of a method 500 for providing filtered sets of sensor data. At least in the illustrated embodiment, the method 500 can begin by a processor (e.g., processor 208A, 208B, 208C, or 208D (also simply referred to individually or collectively as, processor(s) 208)) implementing a permission of a plurality of permissions for user sensor data (block 502). The implemented permission can be any one or more of the permissions discussed elsewhere herein.

The processor 208 receives, from a set of sensors 204 configured to detect raw user sensor data, a set of raw sensor data for a user (block 504). The set of raw sensor data for the user may include any of the raw sensor data discussed elsewhere herein.

The processor 208 generates (in real-time or not in real-time) a set of sensor data for the user based on the received set of raw sensor data (block 506). The set of sensor data for the user may include any of the sensor data discussed elsewhere herein. In some embodiments, the processor 208 can automatedly generate the set of sensor data.

Next, the processor 208 filters the set of sensor data in accordance with and/or consistent with the implemented set of permissions to generate (in real-time or not in real-time) a filtered set of sensor data for the user (block 508). The filtered set of sensor data for the user may include any of the filtered sensor data discussed elsewhere herein. In some embodiments, the processor 208 can automatedly generate the filtered set of raw sensor data.

The filtered set of sensor data for the user is transmitted by the processor 208 (in real-time or not in real-time) to one or more external device 104 (block 510). In some embodiments, the implemented set of permissions can determine and/or select which external device(s) 104 receive the filtered set of sensor data.

In some embodiments, the processor 208 can automatedly transmit the filtered set of raw sensor data to the external device(s) 104. In additional or alternative embodiments, the processor 208 can transmit the filtered set of sensor data to the external device(s) 104 without the external device(s) 104 having to request the filtered set of sensor data and/or without having to calculate the filtered set of sensor data.

Figure 6:
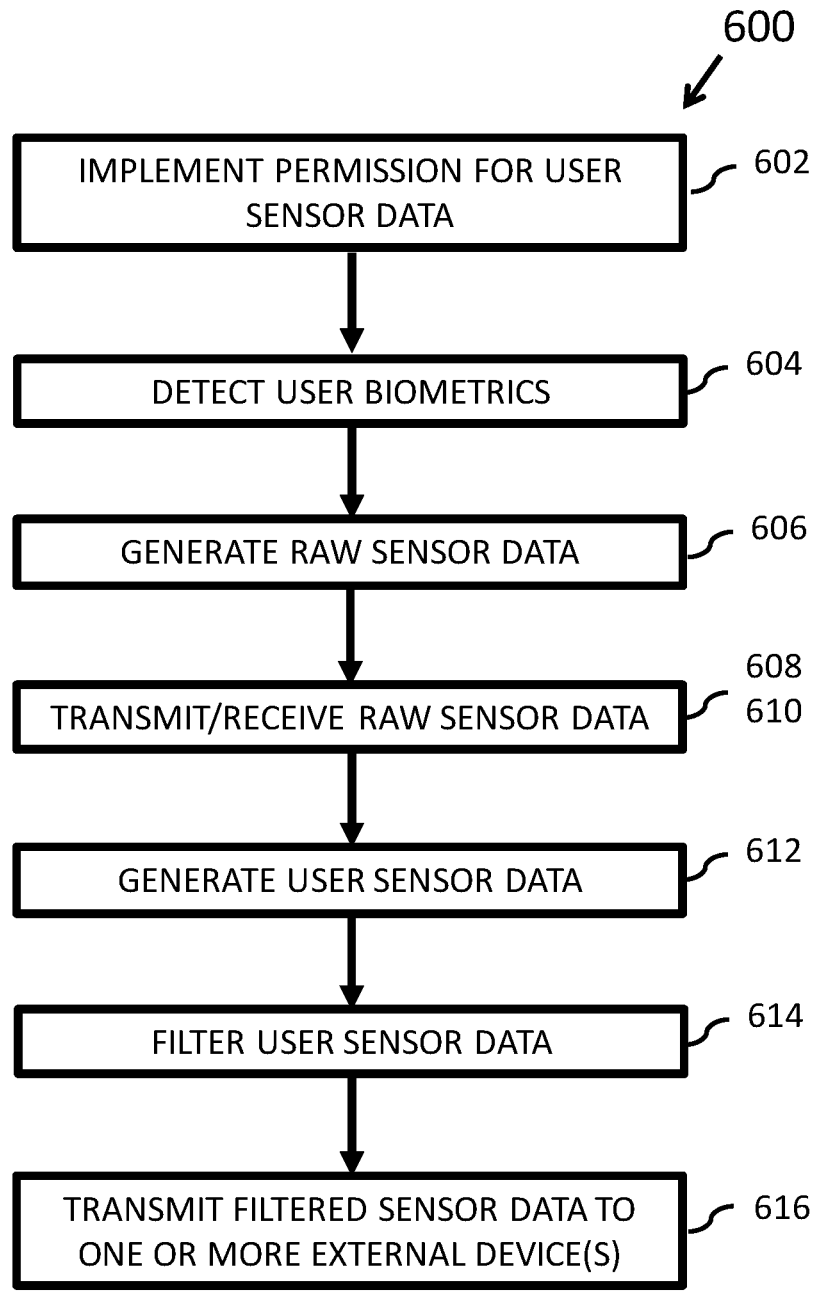

Referring to FIG. 6, FIG. 6 is a schematic flow chart diagram illustrating one embodiment of a method 600 for providing filtered sets of sensor data. At least in the illustrated embodiment, the method 600 can begin by a processor 208 implementing a permission of a plurality of permissions for user sensor data (block 602). The implemented permission can be any one or more of the permissions discussed elsewhere herein.

A set of sensors 204 configured to detect raw user sensor data detects a set of biometric properties/states of a user (block 604) and generates a set of raw sensor data corresponding to the detected set of biometric properties/states (block 606). The set of raw sensor data for the user may include any of the raw sensor data discussed elsewhere herein. The sensor(s) 204 can transmit (in real-time or not in real-time) the set of raw sensor data to a processor 208 (block 608) and the processor 208 receives, from the set of sensors 204, the set of raw sensor data for a user (block 610).

In response to receiving the set of raw sensor data, the processor 208 generates (in real-time or not in real-time) a set of sensor data for the user based on the received set of raw sensor data (block 612). The set of sensor data for the user may include any of the sensor data discussed elsewhere herein. In some embodiments, the processor 208 can automatedly generate the set of sensor data.

The processor 208 filters the set of sensor data in accordance with and/or consistent with the implemented set of permissions to generate (in real-time or not in real-time) a filtered set of sensor data for the user (block 614). The filtered set of sensor data for the user may include any of the filtered sensor data discussed elsewhere herein. In some embodiments, the processor 208 can automatedly generate the filtered set of raw sensor data.

The filtered set of sensor data for the user is transmitted by the processor 208 (in real-time or not in real-time) to one or more external device 104 (block 616). In some embodiments, the implemented set of permissions can determine and/or select which external device(s) 104 receive the filtered set of sensor data.

In some embodiments, the processor 208 can automatedly transmit the filtered set of raw sensor data to the external device(s) 104. In additional or alternative embodiments, the processor 208 can transmit the filtered set of sensor data to the external device(s) 104 without the external device(s) 104 having to request the filtered set of sensor data and/or without having to calculate the filtered set of sensor data.

Figure 7:
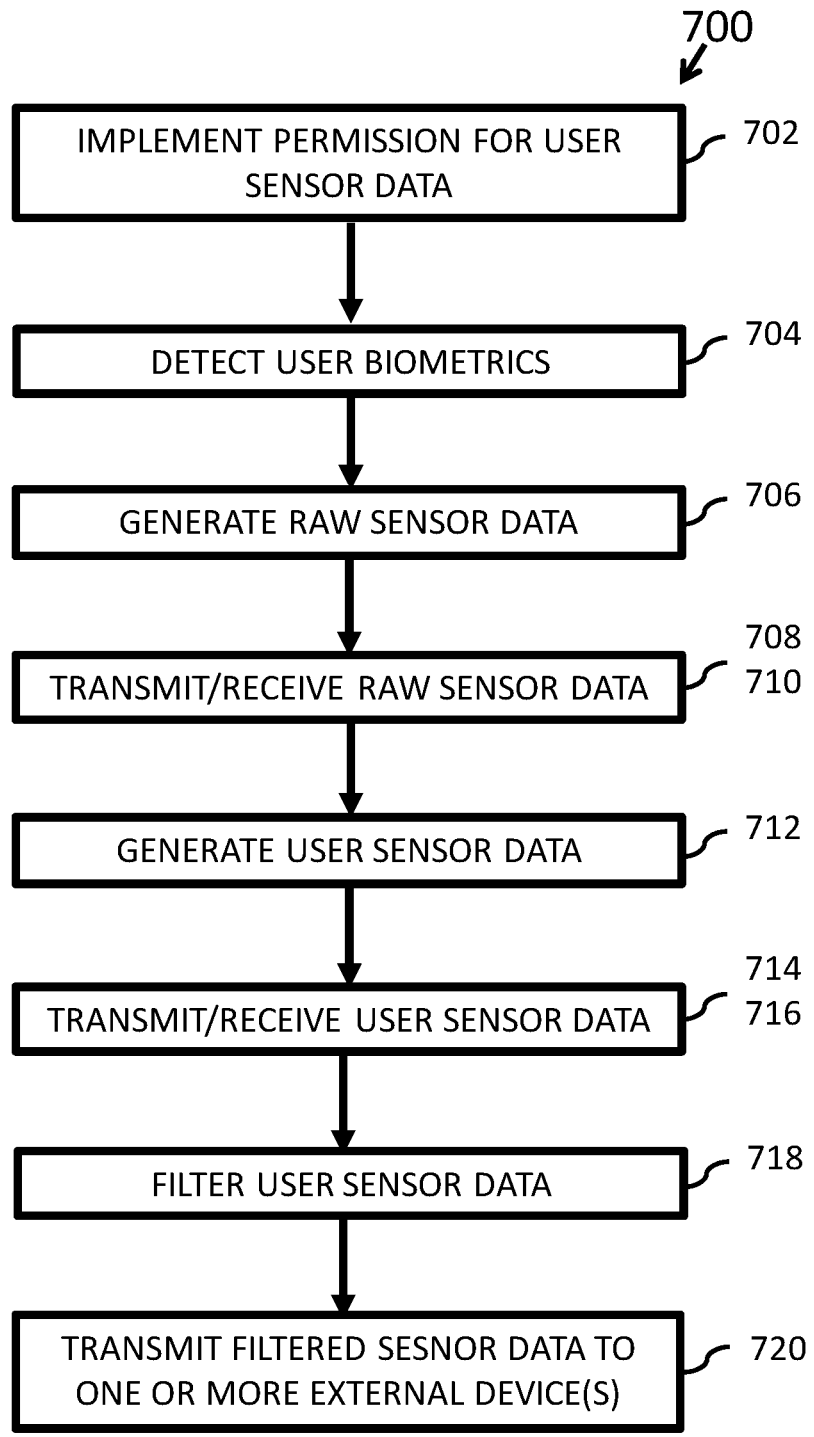

With reference to FIG. 7, FIG. 7 is a schematic flow chart diagram illustrating one embodiment of a method 700 for providing filtered sets of sensor data. At least in the illustrated embodiment, the method 700 can begin by a processor 208 implementing a permission of a plurality of permissions for user sensor data (block 702). The implemented permission can be any one or more of the permissions discussed elsewhere herein.

A set of sensors 204 configured to detect raw user sensor data detects a set of biometric properties/states of a user (block 704) and generates a set of raw sensor data corresponding to the detected set of biometric properties/states (block 706). The set of raw sensor data for the user may include any of the raw sensor data discussed elsewhere herein. The sensor(s) 204 can transmit (in real-time or not in real-time) the set of raw sensor data to a processor 208 (block 708) and the processor 208 receives, from the set of sensors 204, the set of raw sensor data for a user (block 710).

In response to receiving the set of raw sensor data, the processor 208 generates (in real-time or not in real-time) a set of sensor data for the user based on the received set of raw sensor data (block 712). The set of sensor data for the user may include any of the sensor data discussed elsewhere herein. In some embodiments, the processor 208 can automatedly generate the set of sensor data. The processor 208 can transmit (in real-time or not in real-time) the set of sensor data to a filter module 302A (block 714) and the filter module 304A receives, from the processor 208, the set of sensor data for a user (block 716).

The filter module 302A filters the set of sensor data in accordance with and/or consistent with the implemented set of permissions to generate (in real-time or not in real-time) a filtered set of sensor data for the user (block 718). The filtered set of sensor data for the user may include any of the filtered sensor data discussed elsewhere herein. In some embodiments, the filter module 302A can automatedly generate the filtered set of raw sensor data.

The filtered set of sensor data for the user is transmitted by the filter module 302A (in real-time or not in real-time) to one or more external device 104 (block 720). In some embodiments, the implemented set of permissions can determine and/or select which external device(s) 104 receive the filtered set of sensor data.

In some embodiments, the filter module 302A can automatedly transmit the filtered set of raw sensor data to the external device(s) 104. In additional or alternative embodiments, the filter module 302A can transmit the filtered set of sensor data to the external device(s) 104 without the external device(s) 104 having to request the filtered set of sensor data and/or without having to calculate the filtered set of sensor data.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
 a processor coupleable to a set of sensors configured to generate a set raw sensor data and coupleable to a set of external entities; and
 a memory coupled to the processor and configured to store code executable by the processor to:
  generate, from the set of raw sensor data, a set of sensor data for a user,
  filter the set of sensor data based on a permission of a plurality of permissions selected by the user prior to receipt of the set of raw sensor data from the set of sensors, and
  automatedly provide the filtered set of sensor data to the set of external entities,
  wherein the filtered set of sensor data automatedly provided to the set of external entities comprises a subset of the set of sensor data for the user corresponding to a nexus between the permission and one of the set of external entities, a geographic location of the apparatus, time, and a quantity of previously filtered sets of sensor data for the user automatedly provided to the set of external entities.

2. The apparatus of claim 1, wherein automatedly providing the filtered set of sensor data to the set of external entities comprises at least one of:
 automatedly providing the filtered set of sensor data to the set of external entities without the set of external entities having to request the set of sensor data; and
 automatedly providing the filtered set of sensor data to the set of external entities without the set of external entities having to compute the set of sensor data.

3. The apparatus of claim 2, wherein the code executable by the processor for filtering the received set of sensor data in real-time is computationally located between the set of sensors and the set of external entities.

4. The apparatus of claim 1, wherein the filtered set of sensor data automatedly provided to the set of external entities comprises the subset of the set of sensor data for the user corresponding to the nexus between the permission and the set of external entities.

5. The apparatus of claim 1, wherein the filtered set of sensor data automatedly provided to the set of external entities comprises the subset of the set of sensor data for the user corresponding to the nexus between the permission and the geographic location of the apparatus.

6. The apparatus of claim 1, wherein the filtered set of sensor data automatedly provided to the set of external entities comprises the subset of the set of sensor data for the user corresponding to the nexus between the permission and time.

7. The apparatus of claim 1, wherein the filtered set of sensor data automatedly provided to the set of external entities comprises the subset of the set of sensor data for the user corresponding to the nexus between the permission and the quantity of previously filtered sets of sensor data for the user automatedly provided to the set of external entities.

8. A method, comprising:
 generating, by a processor from a set of raw sensor data generated by a set of sensors, a set of sensor data for a user;
 filtering, by the processor, the set of sensor data based on a permission of a plurality of permissions selected by the user prior to receipt of the set of raw sensor data from the set of sensors; and
 automatedly providing, by the processor, the filtered set of sensor data to a set of external entities,
 wherein the filtered set of sensor data automatedly provided to the set of external entities comprises a subset of the set of sensor data for the user corresponding to a nexus between the permission and one of the set of external entities, a geographic location of the apparatus, time, and a quantity of previously filtered sets of sensor data for the user automatedly provided to the set of external entities.

9. The method of claim 8, wherein automatedly providing the filtered set of sensor data to the set of external entities comprises at least one of:

automatedly providing the filtered set of sensor data to the set of external entities without the set of external entities having to request the set of sensor data; and automatedly providing the filtered set of sensor data to the set of external entities without the set of external entities having to compute the set of sensor data.

10. The method of claim 8, wherein:
filtering the set of sensor data in real-time comprises filtering, in real-time, the received set of sensor data to include the subset of the set of sensor data for the user corresponding to the nexus between the permission and the set of external entities; and automatedly providing the filtered set of sensor data to the set of external entities comprises automatedly providing the subset of the set of sensor data for the user corresponding to the nexus between the permission and the set of external entities.

11. The method of claim 8, wherein:
filtering the set of sensor data in real-time comprises filtering, in real-time, the received set of sensor data to include the subset of the set of sensor data for the user corresponding to the nexus between the permission and the geographic location of the apparatus; and automatedly providing the filtered set of sensor data to the set of external entities comprises automatedly providing the subset of the set of sensor data for the user corresponding to the nexus between the permission and the geographic location of the apparatus.

12. The method of claim 8, wherein:
filtering the set of sensor data in real-time comprises filtering, in real-time, the received set of sensor data to include the subset of the set of sensor data for the user corresponding to the nexus between the permission and time; and automatedly providing the filtered set of sensor data to the set of external entities comprises automatedly providing the subset of the set of sensor data for the user corresponding to the nexus between the permission and time.

13. The method of claim 8, wherein:
filtering the set of sensor data in real-time comprises filtering, in real-time, the received set of sensor data to include a newly filtered set of sensor data for the user corresponding to the nexus between the permission and the quantity of previously filtered sets of sensor data for the user automatedly provided to the set of external entities; and automatedly providing the filtered set of sensor data to the set of external entities comprises automatedly providing the newly filtered sensor data for the user corresponding to the nexus between the permission and the quantity of previously filtered sets of sensor data for the user automatedly provided to the set of external entities.

14. A computer program product comprising a non-transitory computer-readable storage medium configured to store code executable by a processor, the executable code comprising code to perform:
generating, from a set of raw sensor data generated by a set of sensors, a set of sensor data for a user;
filtering the set of sensor data based on a permission of a plurality of permissions selected by the user prior to receipt of the set of raw sensor data from the set of sensors; and
automatedly providing the filtered set of sensor data to a set of external entities, wherein the filtered set of sensor data automatedly provided to the set of external entities comprises a subset of the set of sensor data for the user corresponding to a nexus between the permission and one of the set of external entities, a geographic location of the apparatus, time, and a quantity of previously filtered sets of sensor data for the user automatedly provided to the set of external entities.

15. The computer program product of claim 14, wherein automatedly providing the filtered set of sensor data to the set of external entities comprises at least one of:
automatedly providing the filtered set of sensor data to the set of external entities without the set of external entities having to request the set of sensor data; and
automatedly providing the filtered set of sensor data to the set of external entities without the set of external entities having to compute the set of sensor data.

16. The computer program product of claim 15, wherein the code executable by the processor for filtering the received set of sensor data in real-time is computationally located between the set of sensors and the set of external entities.

17. The computer program product of claim 14, wherein:
filtering the set of sensor data in real-time comprises filtering, in real-time, the received set of sensor data to include the subset of the set of sensor data for the user corresponding to the nexus between the permission and the set of external entities; and automatedly providing the filtered set of sensor data to the set of external entities comprises automatedly providing the subset of the set of sensor data for the user corresponding to the nexus between the permission and the set of external entities.

18. The computer program product of claim 14, wherein:
filtering the set of sensor data in real-time comprises filtering, in real-time, the received set of sensor data to include the subset of the set of sensor data for the user corresponding to the nexus between the permission and a geographic location of the apparatus; and automatedly providing the filtered set of sensor data to the set of external entities comprises automatedly providing the subset of the set of sensor data for the user corresponding to the nexus between the permission and the geographic location of the apparatus.

19. The computer program product of claim 14, wherein:
filtering the set of sensor data in real-time comprises filtering, in real-time, the received set of sensor data to include the subset of the set of sensor data for the user corresponding to the nexus between the permission and time; and automatedly providing the filtered set of sensor data to the set of external entities comprises automatedly providing the subset of the set of sensor data for the user corresponding to the nexus between the permission and time.

20. The computer program product of claim 14, wherein:
filtering the set of sensor data in real-time comprises filtering, in real-time, the received set of sensor data to include a newly filtered set of sensor data for the user corresponding to the nexus between the permission and the quantity of previously filtered sets of sensor data for the user automatedly provided to the set of external entities; and automatedly providing the filtered set of sensor data to the set of external entities comprises automatedly providing the newly filtered sensor data for the user corresponding to the nexus between the permission and the quantity of previously filtered sets of sensor data for the user automatedly provided to the set of external entities.

\* \* \* \* \*